United States Patent
Sandberg

(10) Patent No.: US 10,480,602 B2
(45) Date of Patent: Nov. 19, 2019

(54) DISC BRAKE, BRAKE ACTUATION MECHANISM FOR SUCH A DISC BRAKE AND METHOD FOR BRAKE ADJUSTMENT

(71) Applicant: Haldex Brake Products AB, Landskrona (SE)

(72) Inventor: Stefan Sandberg, Lomma (SE)

(73) Assignee: Haldex Brake Products AB (SE)

(*) Notice: Subject to any disclaimer, the term of this patent is extended or adjusted under 35 U.S.C. 154(b) by 178 days.

(21) Appl. No.: 14/775,407

(22) PCT Filed: Mar. 11, 2013

(86) PCT No.: PCT/EP2013/054917
§ 371 (c)(1),
(2) Date: Sep. 11, 2015

(87) PCT Pub. No.: WO2013/083857
PCT Pub. Date: Jun. 13, 2013

(65) Prior Publication Data
US 2016/0017946 A1    Jan. 21, 2016

(51) Int. Cl.
*F16D 65/12* (2006.01)
*F16D 65/66* (2006.01)
(Continued)

(52) U.S. Cl.
CPC ......... *F16D 65/66* (2013.01); *F16D 55/2265* (2013.01); *F16D 65/0068* (2013.01);
(Continued)

(58) Field of Classification Search
CPC ........ F16D 65/56; F16D 65/567; F16D 65/62; F16D 65/66; F16D 65/70; F16D 65/568; F16D 2125/26
See application file for complete search history.

(56) References Cited

U.S. PATENT DOCUMENTS 5,086,885 A * 2/1992 Bowsher ................ F16D 65/18
188/196 D
2010/0109427 A1* 5/2010 Baumann ................ B60T 8/266
303/9.75
(Continued)

FOREIGN PATENT DOCUMENTS

DE    4034165 A1   12/1991
DE   10209567 A1   11/2002
(Continued)

OTHER PUBLICATIONS

Machine translation of DE 10 2012102577 (no date).*
Machine translation of DE 20 2007019600 (no date).*

*Primary Examiner* — Nicholas J Lane
(74) *Attorney, Agent, or Firm* — St. Onge Steward Johnson and Reens LLC

(57) ABSTRACT

A disc brake including a brake actuation mechanism and an adjustment mechanism, which is configured to provide, in addition to a reduction of the clearance between a brake pad and a brake disc during brake application, a further increase of the clearance during brake release motion with a value, which may be smaller, equal or larger than the previous clearance reduction. The brake actuation mechanism for that purpose could provide a different regulator unit. Moreover, the invention suggests a method for adjusting the clearance between a brake pad and a brake disc providing a clearance increase during brake release motion, accordingly.

26 Claims, 19 Drawing Sheets

(51) Int. Cl.
  *F16D 65/18*   (2006.01)
  *F16D 65/56*   (2006.01)
  *F16D 55/2265* (2006.01)
  *F16D 65/00*   (2006.01)
  *F16D 125/28*  (2012.01)
  *F16D 55/00*   (2006.01)

(52) U.S. Cl.
  CPC .......... *F16D 65/18* (2013.01); *F16D 65/567* (2013.01); *F16D 2055/0016* (2013.01); *F16D 2125/28* (2013.01)

(56) References Cited

U.S. PATENT DOCUMENTS

| | | | | |
|---|---|---|---|---|
| 2014/0151163 | A1* | 6/2014 | Plantan | F16D 65/567 188/71.8 |
| 2016/0032996 | A1* | 2/2016 | Baumgartner | F16D 65/568 188/71.9 |
| 2017/0122394 | A1* | 5/2017 | Sandberg | F16D 65/18 |
| 2017/0175837 | A1* | 6/2017 | Pehle | F16D 65/567 |

FOREIGN PATENT DOCUMENTS

| | | | | |
|---|---|---|---|---|
| DE | 102008036034 | A1  |   | 2/2010 |
| DE | 102012102577 | A1  | * | 9/2013 ........... F16D 65/183 |
| DE | 202007019600 | U1  | * | 4/2014 ............ F16D 65/18 |
| EP |      0271864 | A2  |   | 6/1988 |
| EP |      0553105 | A1  |   | 8/1993 |
| EP |      0698749 | A2  |   | 2/1996 |
| EP |      0730107 | A2  |   | 9/1996 |
| EP |      1524449 | A1  |   | 4/2005 |
| WO |      0175324 | A1  |   | 10/2001 |
| WO |   2004059187 | A1  |   | 7/2004 |
| WO |   2011113554 | A2  |   | 9/2011 |
| WO |   2013143955 | A1  |   | 10/2013 |

* cited by examiner

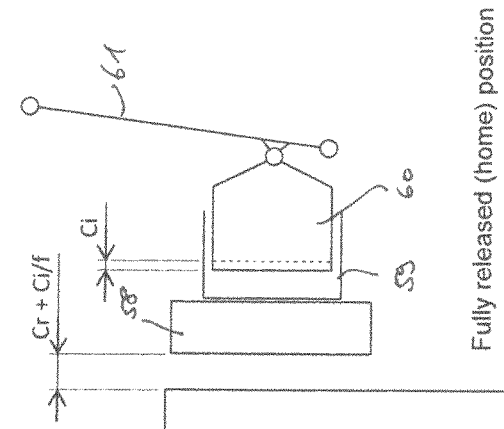
Fig. 4c Fully released (home) position
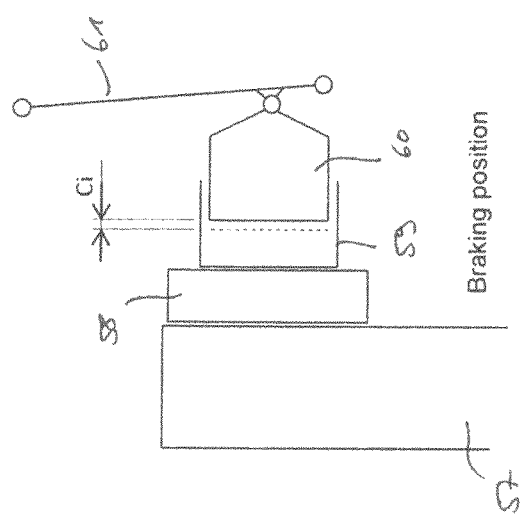
Fig. 4b Braking position
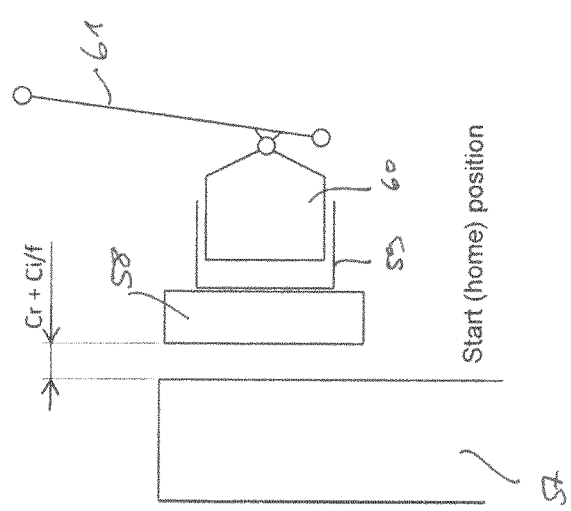
Fig. 4a Start (home) position

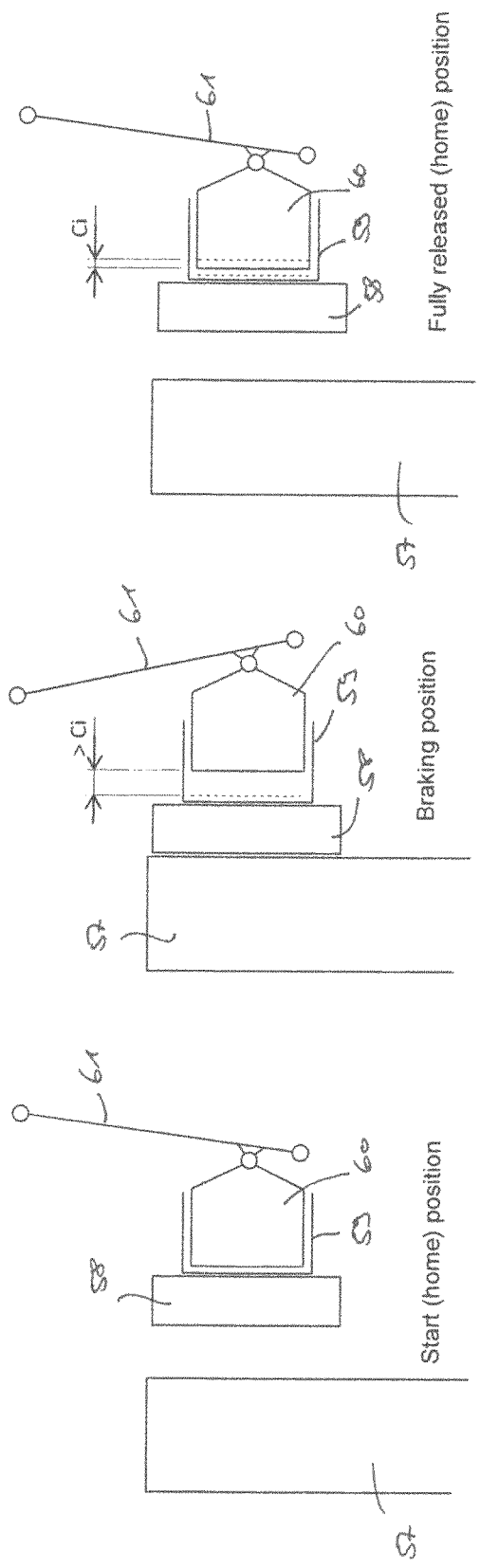

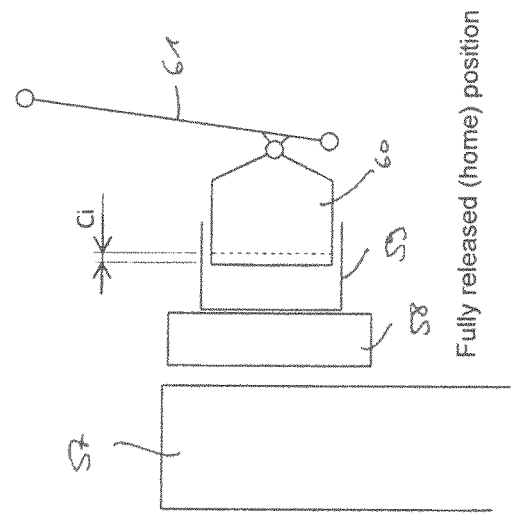
Fig. 6c Fully released (home) position
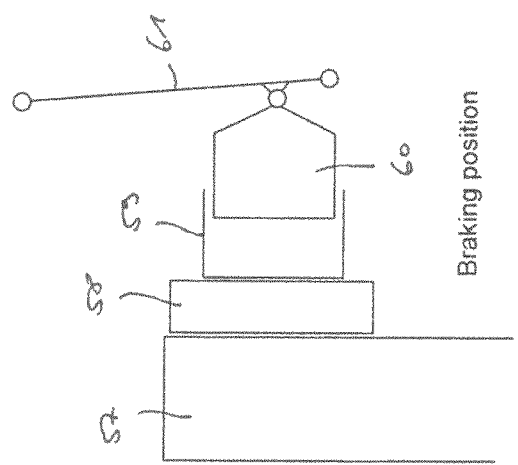
Fig. 6b Braking position
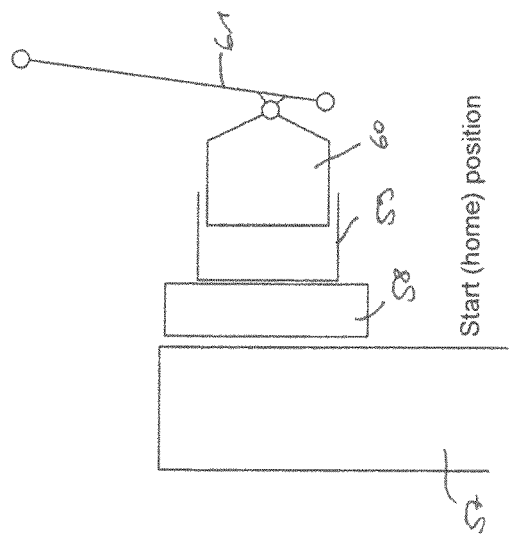
Fig. 6a Start (home) position

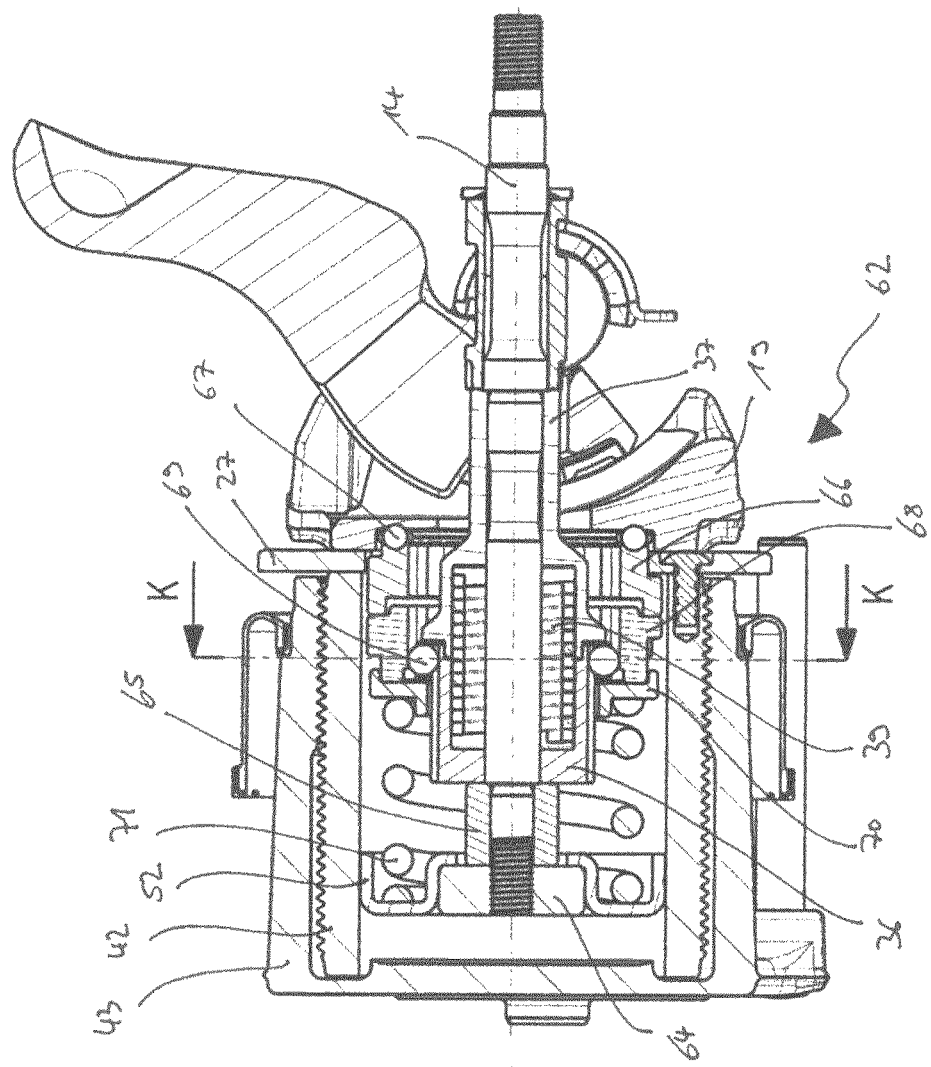
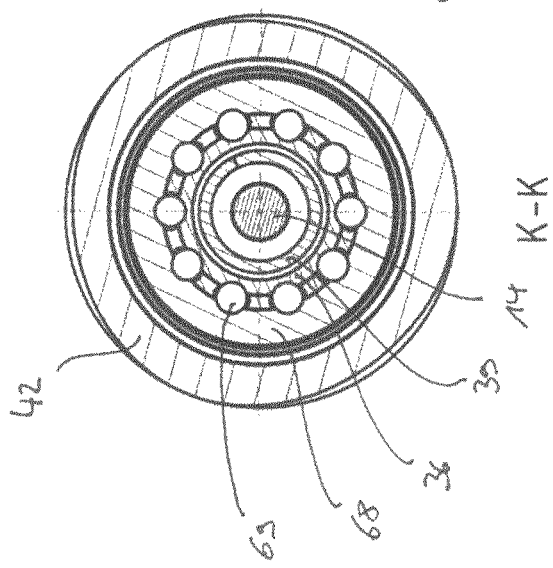

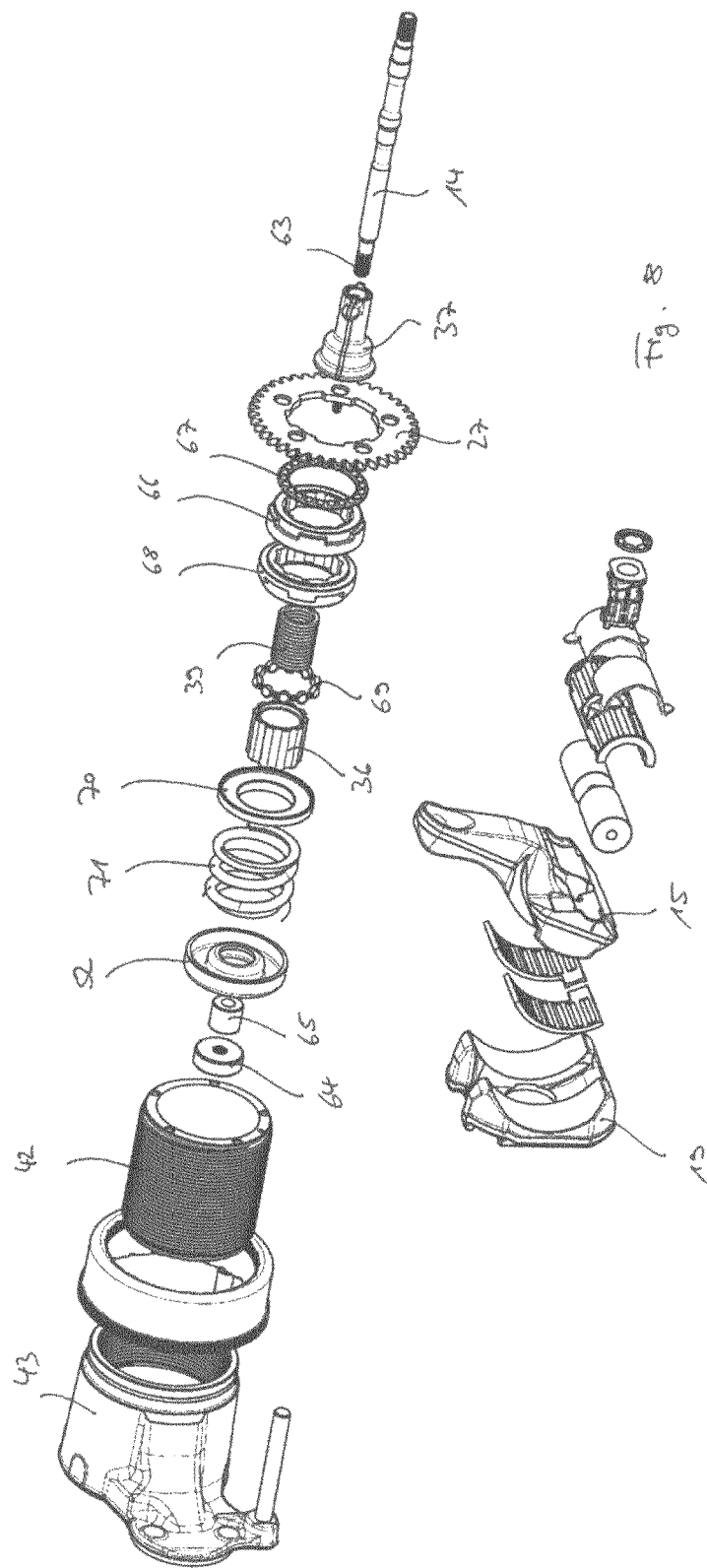

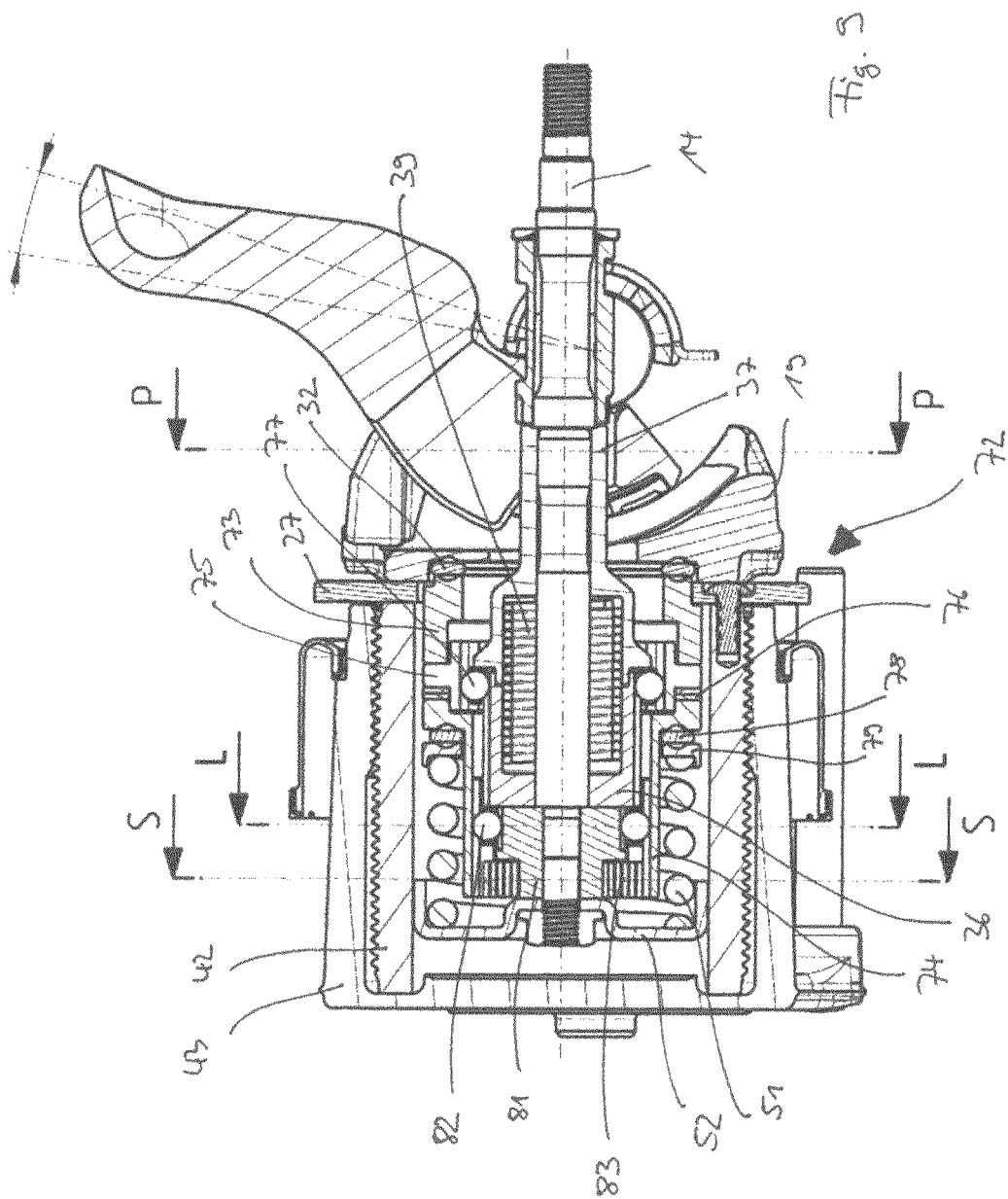

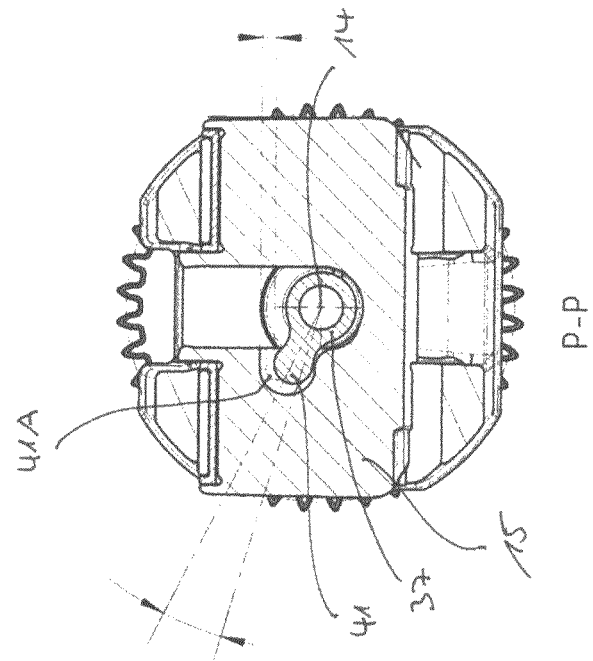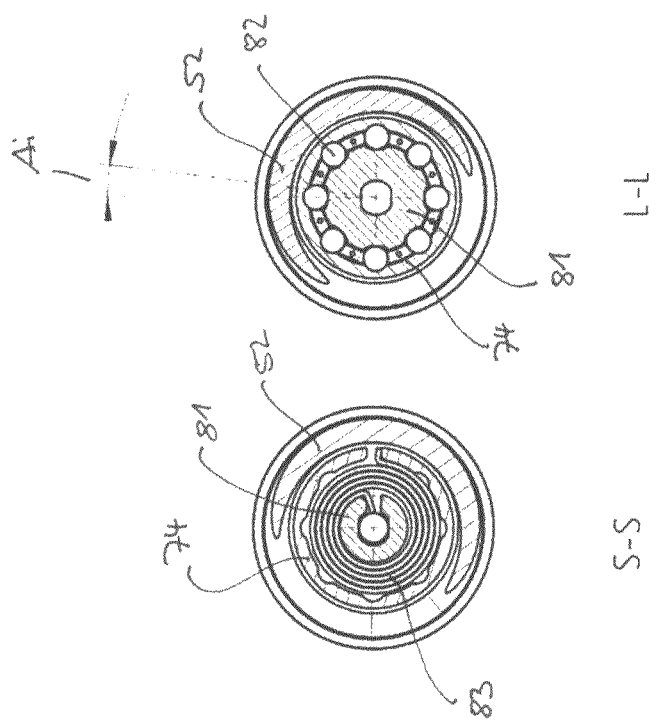

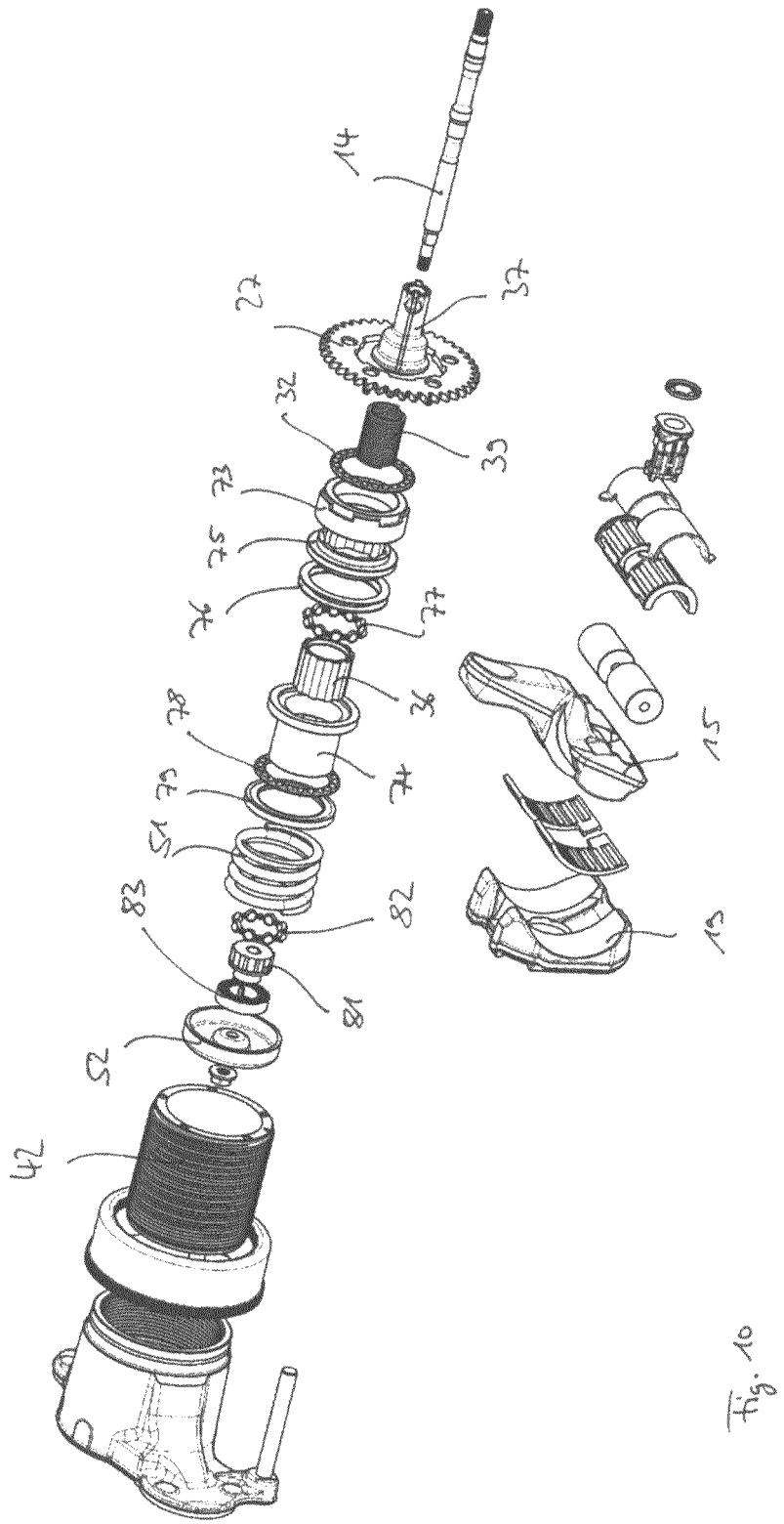

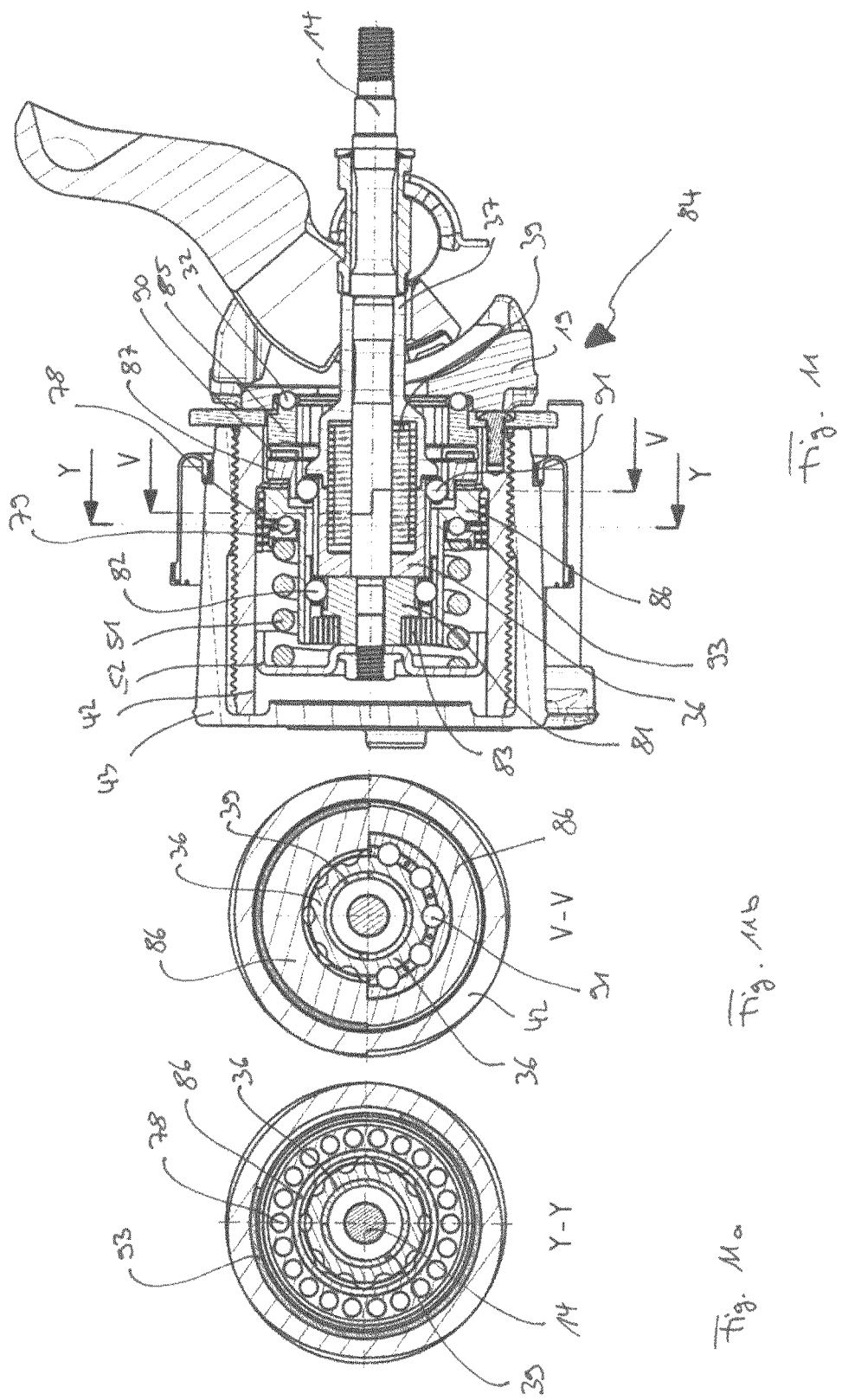

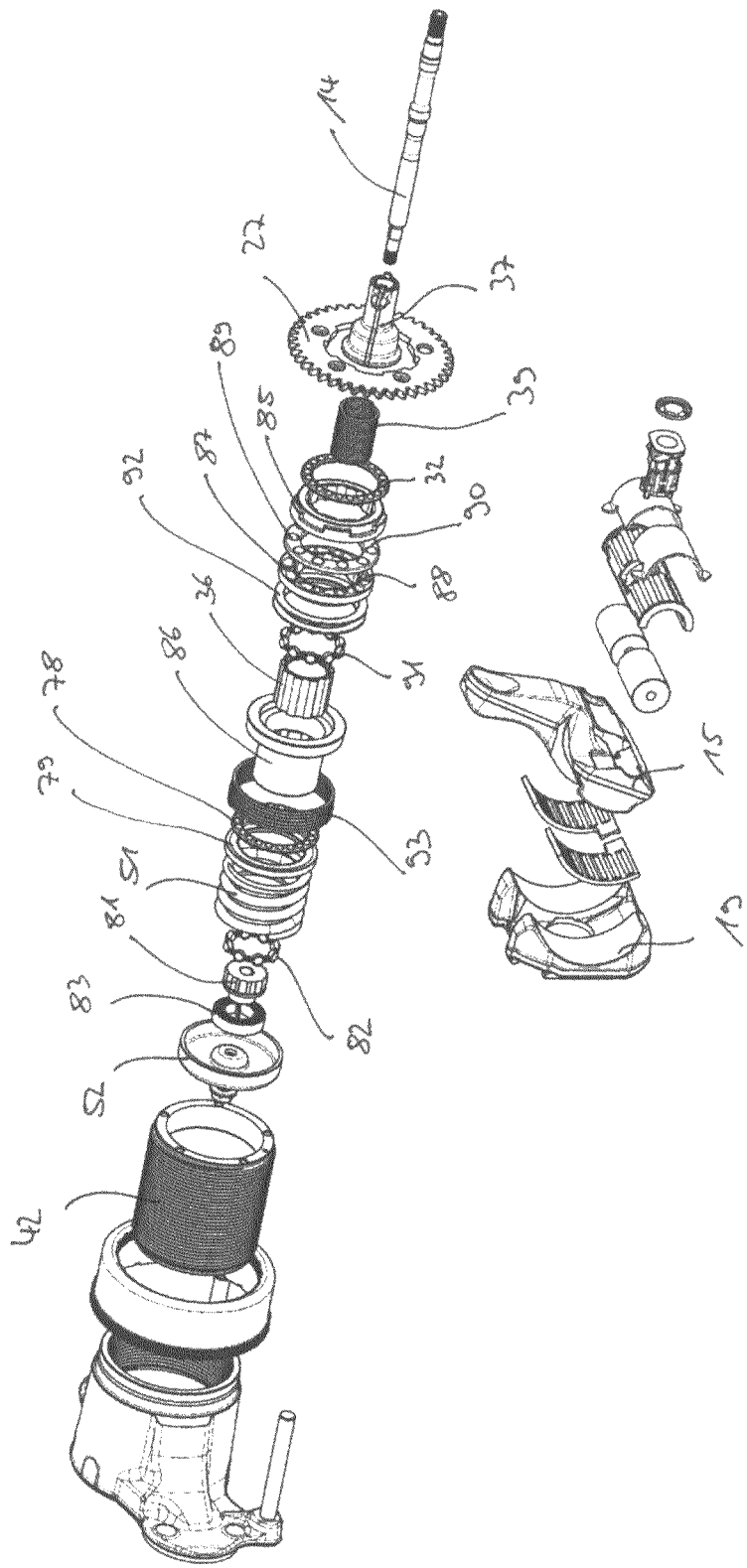

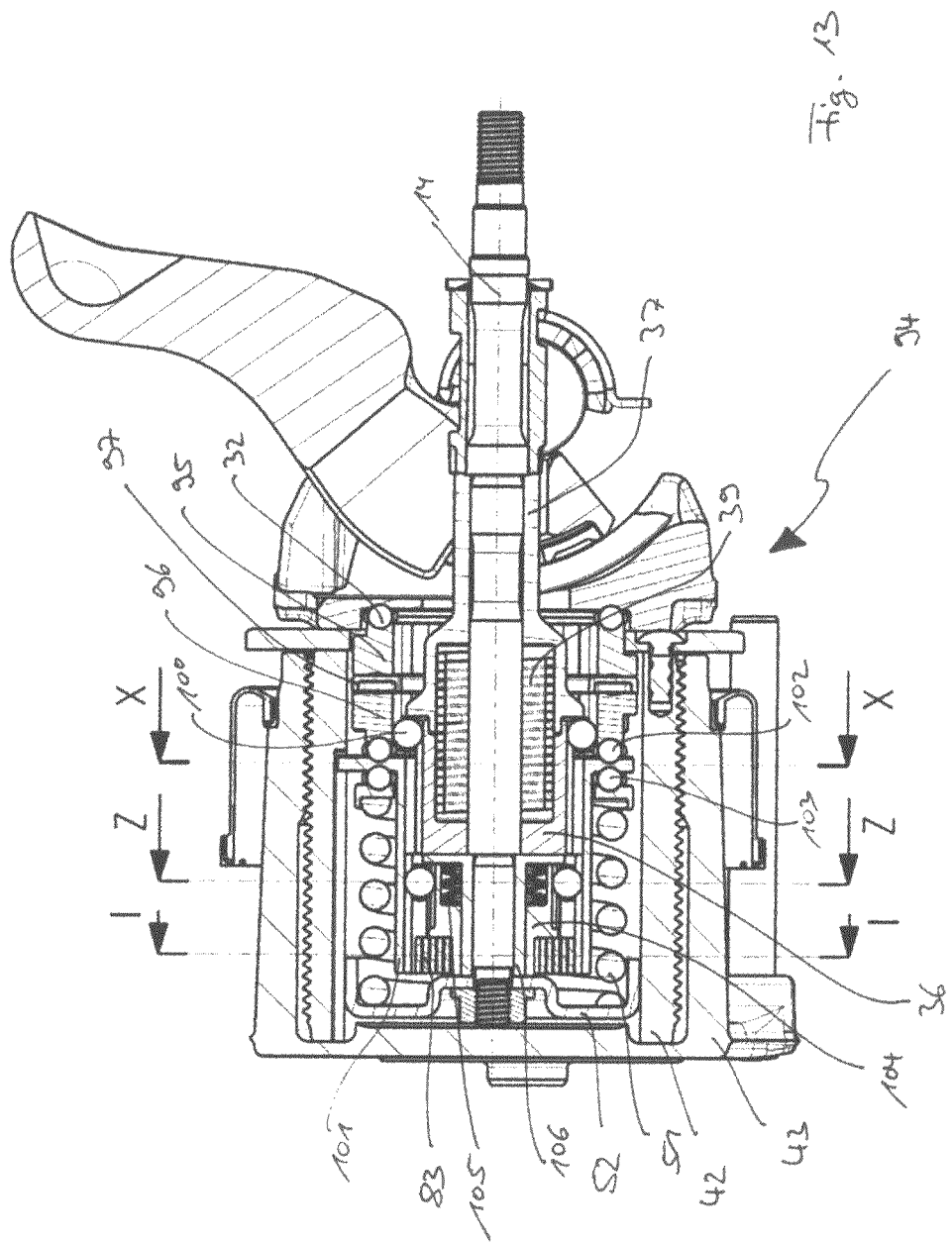

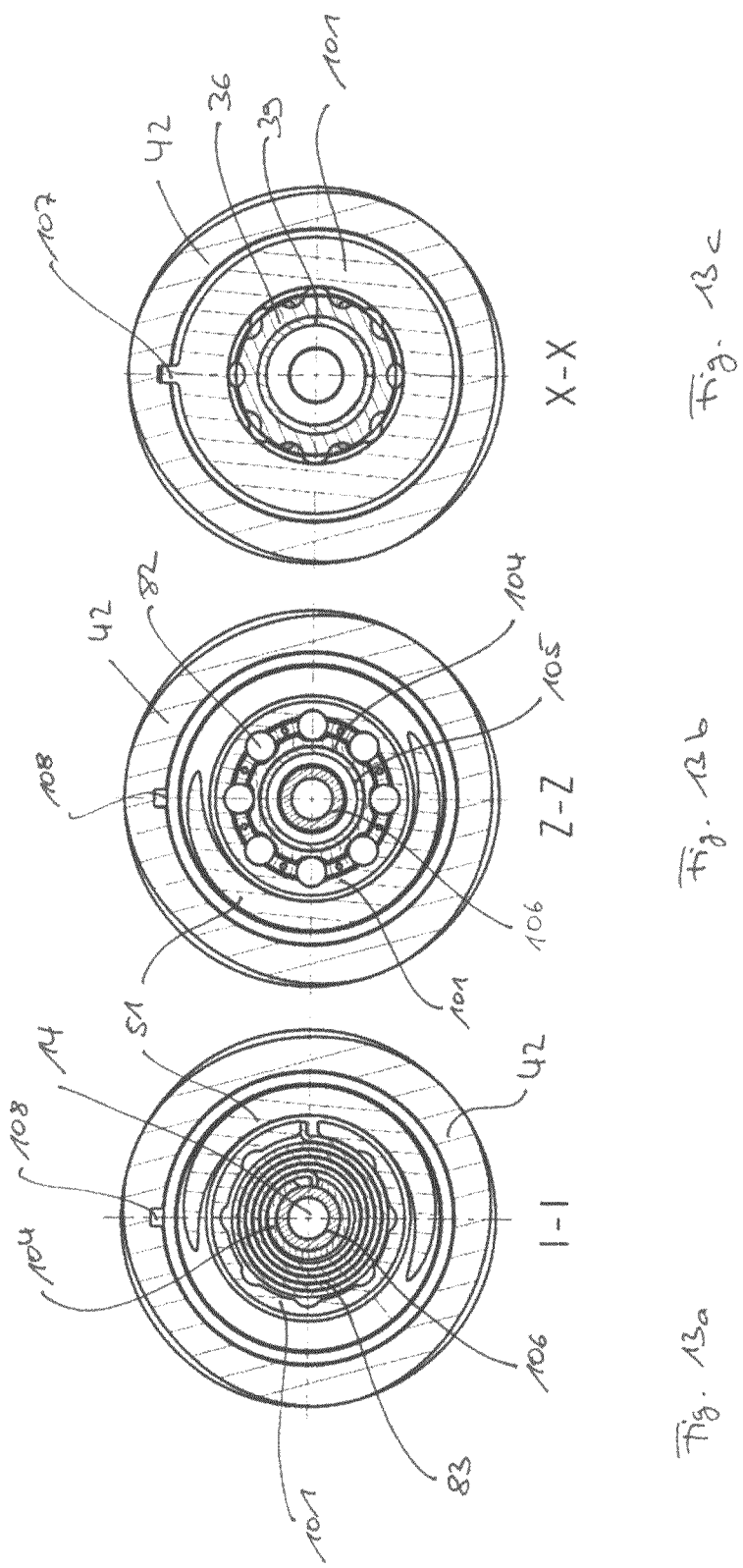

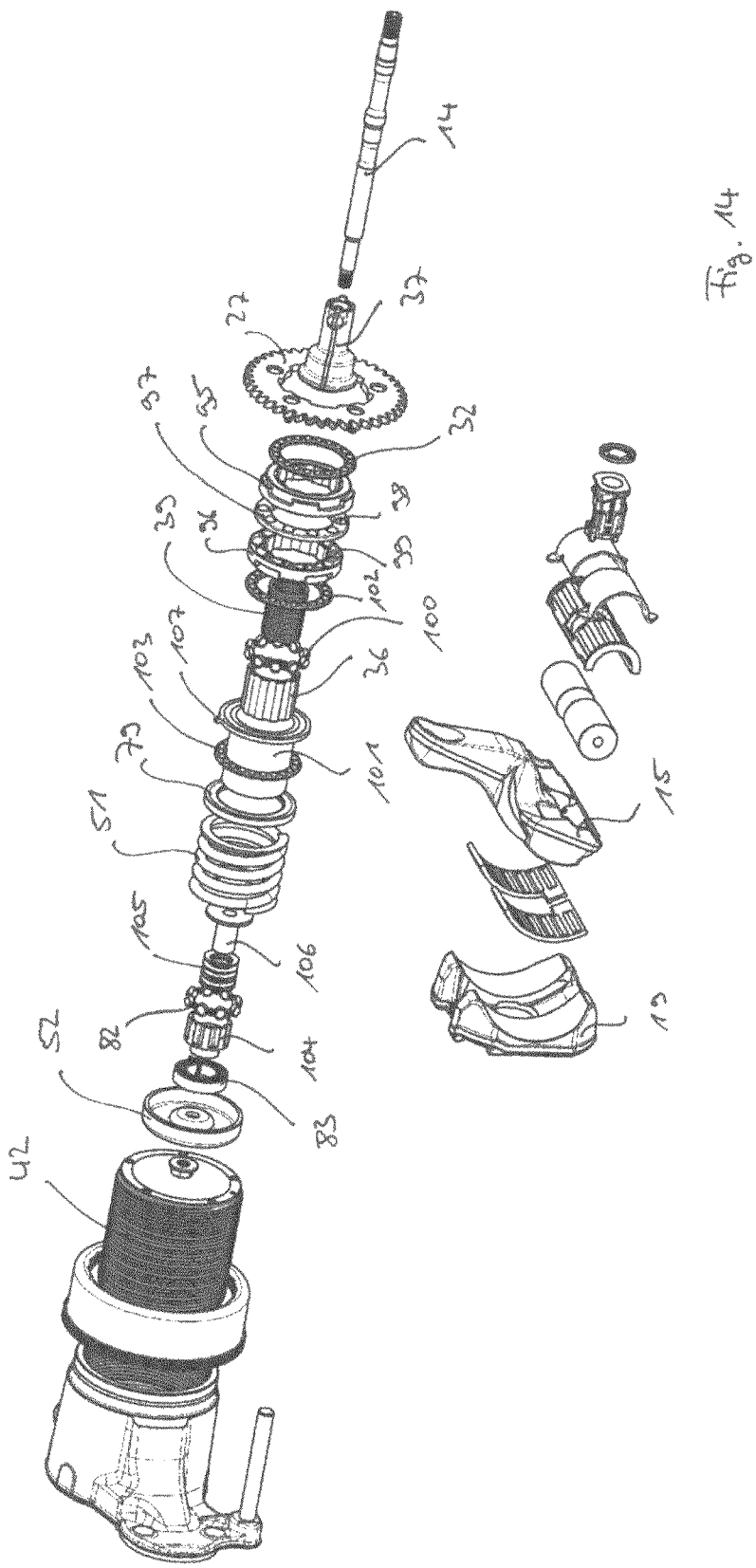

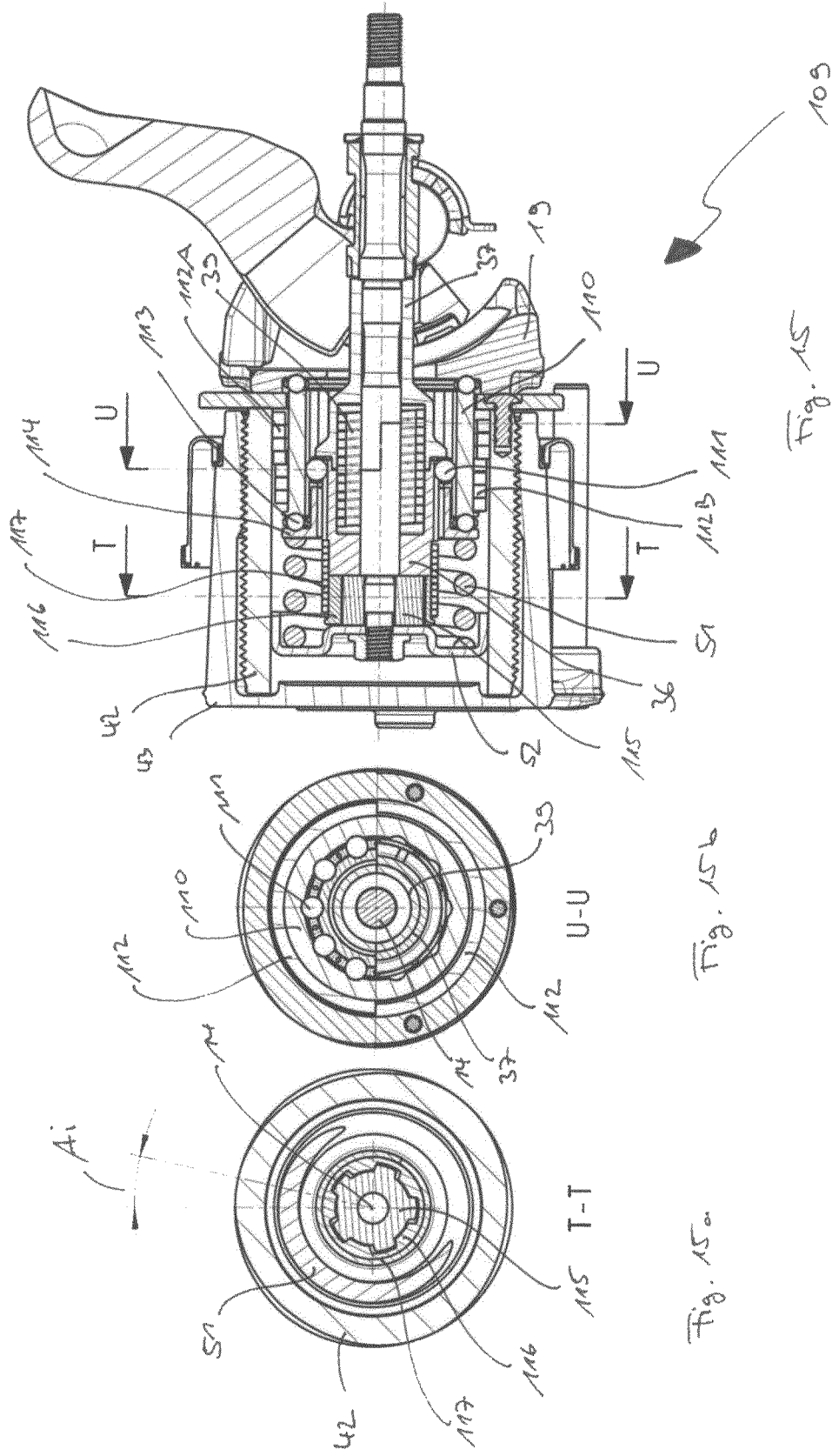

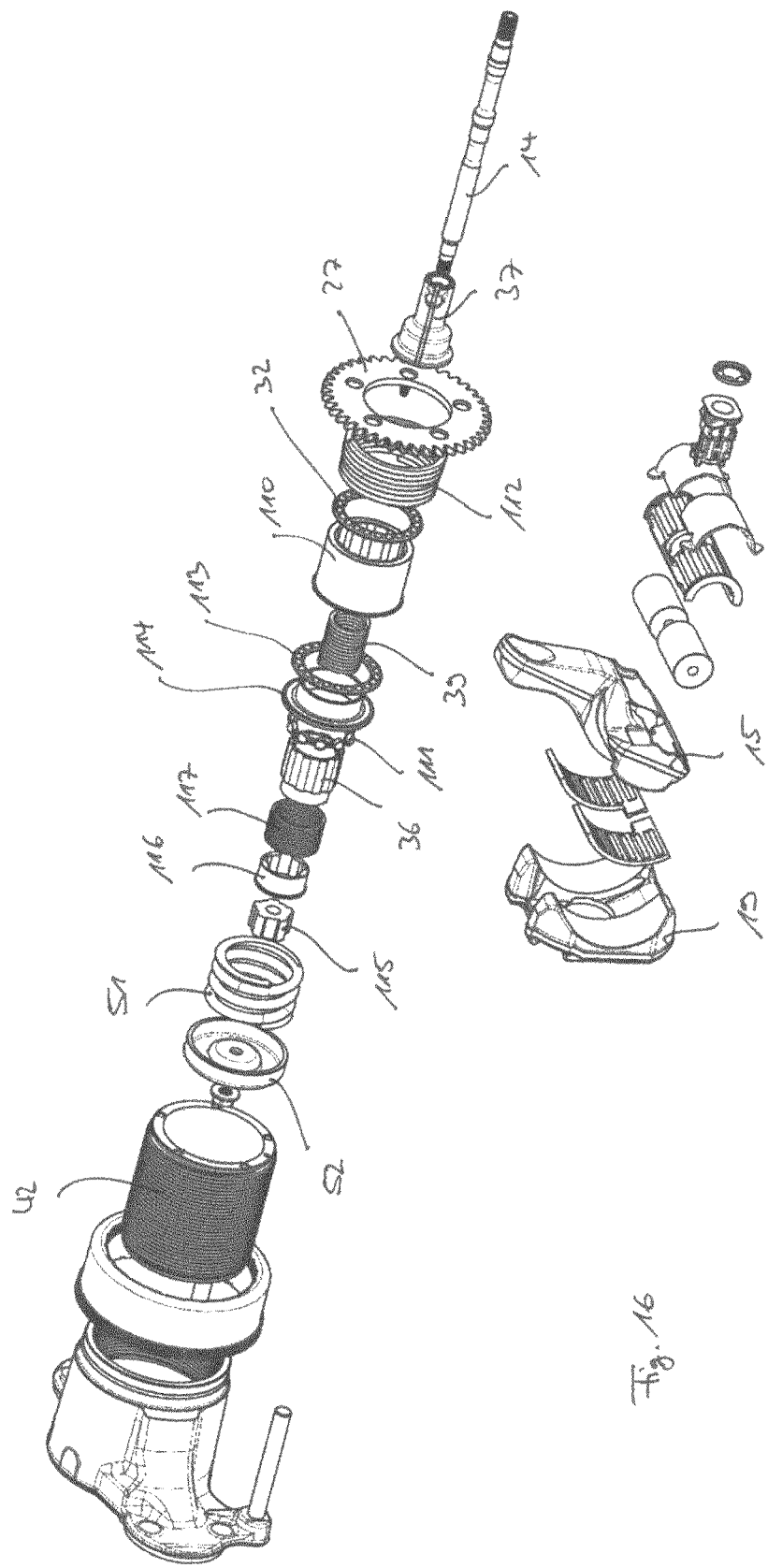

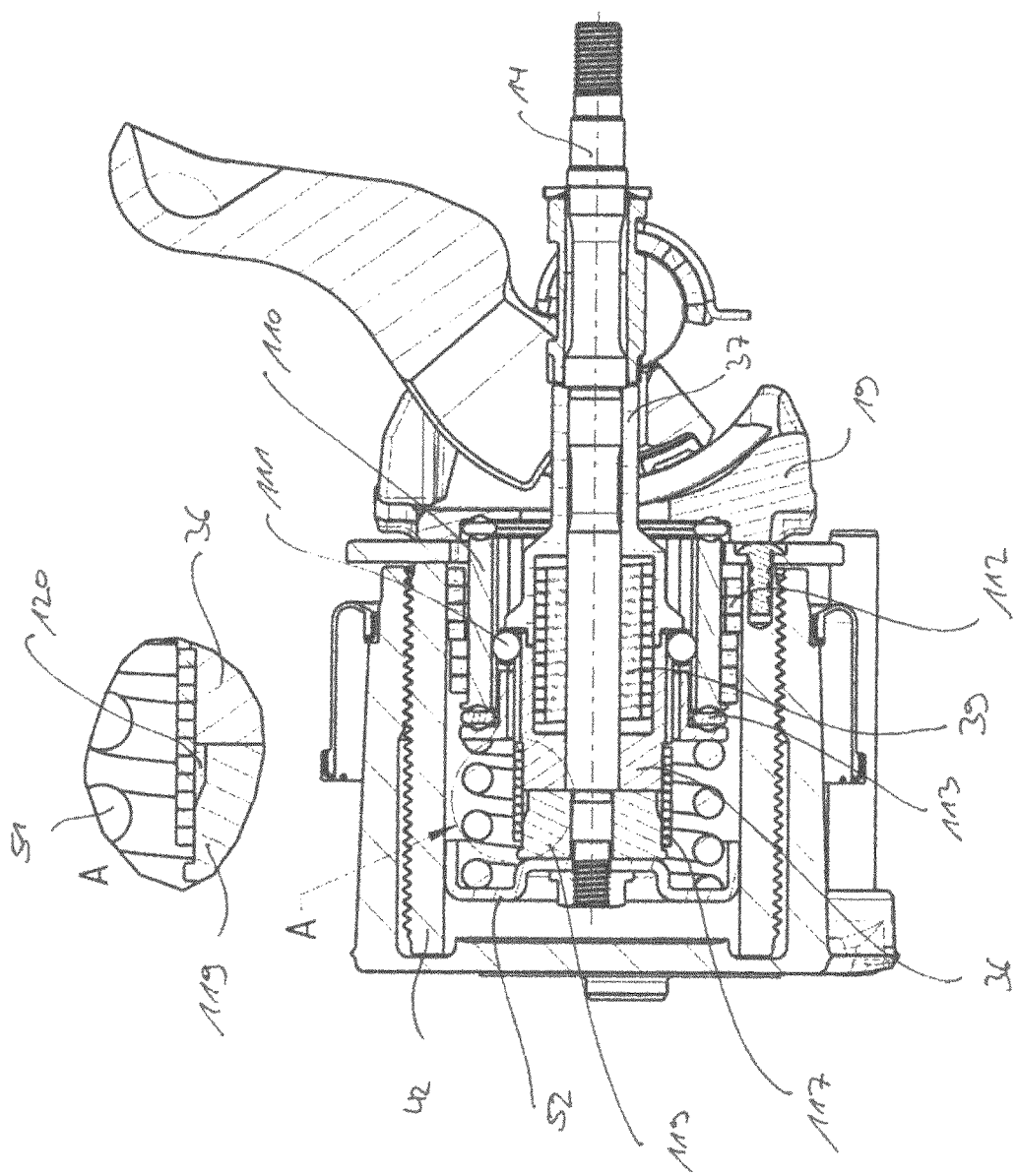

DISC BRAKE, BRAKE ACTUATION MECHANISM FOR SUCH A DISC BRAKE AND METHOD FOR BRAKE ADJUSTMENT

FIELD OF THE INVENTION

The present invention relates to a disc brake, in particular for a utility vehicle, and to a brake actuation mechanism of such a disc brake. Furthermore, the invention refers to a new kind of method for brake adjustment.

BACKGROUND OF THE INVENTION

In this connection the invention shall include disc brakes which either comprise a sliding caliper or a fixed caliper, which overlap one or more brake discs. Mainly but not exclusively the invention relates to disc brakes with lining sections of the spot-type.

Disc brakes, in particular for heavy load trucks, are known with different configurations, both with respect to the type of the actuation mechanism, with respect to the way of the transmission of the braking or clamping force onto one or several brake discs and with respect to the type of the adjustment for compensating the wear of the brake pad and/or the brake disc as well as in this context with respect to the type of the adjustment of the running clearance.

Generally, there exists a wide range of actuation mechanism and brake adjuster designs applied and embodied in disc brakes.

From EP 0 271 864 B1 an actuation device is known which comprises an axial actuation member around which several components are arranged such as a force amplification mechanism in the form of a roller-ramp mechanism. Commonly used actuation mechanisms do embody brake levers which are actuated by hydraulic, pneumatic or electro-mechanic actuators, which lever is transmitting the introductory force usually by means of one or more roller elements to a thrust piece, which is mainly axially guided in the housing of the brake caliper towards the brake disc. Such lever-actuated brake mechanisms are e.g. known from EP 0 553 105 B1 or EP 0 698 749 B1.

An alternative design of a brake actuation mechanism is shown in WO 2001/75324 A1, in which the thrust element for transferring the clamping force onto the brake disc is arranged around a central rod. A similar design is e.g. known from WO 2004/059187 A1 of the applicant. The brake actuation mechanism for a disc brake as disclosed therein comprises the shape of one single tappet and thrust element, respectively, which acts onto the brake disc, in which an adjustment device is already integrated within the tappet. The tappet thereby is mounted in the housing of the brake caliper in parallel to the rotary axis of the brake disc by means of a rod. According to a preferred embodiment the tappet directly cooperates with a return mechanism for the thrust element, which is integrated in the tappet and which cooperates with the rod.

Independent from the design of the actuation mechanism to be employed in this connection, a compensation of the running clearance between the brake disc and the brake lining at the brake pad, which results from the wear at the brake pad lining and/or at the brake disc, has to be always provided. The brake actuation mechanism according to this example of a tappet as mentioned herein at least comprises a thrust element which transmits the clamping force onto the brake disc by means of the brake pads. For that purpose the thrust element comprises at least one rotatable element which interacts with a further element, so that both elements can be axially displaced in relation to each other, in which the latter element is guided in the brake caliper in a non-rotatable manner, however axially displaceable.

As an example such principle is realized by WO 2004/059187 A1 in which two sleeve-like spindles are in a threaded engagement, in which an external sleeve having an internal thread receives an internal sleeve having an external thread in a rotational manner. The external sleeve or outer spindle is supported in the brake caliper or in its carrier in a non-rotatable way, so that rotation of the internal sleeve or inner spindle results in a linear displacement of the outer spindle in relation thereto, so that the outer spindle can be moved towards the brake disc in order to compensate the wear-induced clearance at the brake linings.

For example, the non-rotatable linear guidance of the outer spindle in axial direction can be realized in that the outer spindle is connected either directly or by means of further intermediate elements with the brake pad or the brake lining retainer, which in turn itself are guided in the brake caliper or in the caliper carrier in a linear manner. In other words, due to the fact that the brake pad (brake lining and lining retainer), the lining retainer or the brake lining themselves are guided in the caliper or its carrier in axial direction relative to the brake disc without being rotatable, also the outer spindle of the adjuster being connected with these brake components is exclusively axially and non-rotatably guided.

From WO 2011/113554 A2 of the applicant an enhanced single tappet-type actuation mechanism is known, in which the elements of the return mechanism and the adjustment mechanism are incorporated into the tappet design and surrounded by the unit consisting of the outer and inner sleeves, which both form part of the adjustment mechanism and thus brake actuation mechanism. The adjustment mechanism incorporated therein is driven by the rotatable lever, which introduces the clamping force into the brake actuation mechanism. The clearance between the brake pad and the brake disc according to the actual wear is determined in that the rapid change in the clamping force at brake pad to brake disc contact is sensed merely by mechanical means, so that the adjustment mechanism of that type is automatically adjusting the clearance in a mechanical manner only.

Since the adjustment mechanism known from WO 2011/113554 A2 comprises at least one threaded adjustment screw (inner spindle) interacting with at least one other threaded part (outer spindle) for transmitting the actuating force to the inner brake pad, upon brake application a controlled adjustment is performed in the direction of clearance reduction only. After passing a predetermined distance corresponding to a target clearance between the brake pad and the brake disc, a torque is applied to the threaded parts, when the brake disc comes into contact with the brake pads, thereby forming a closed force flow within the brake actuation mechanism and the caliper. This torque is transmitted from the rotatable lever over an one-way clutch in its driving direction and limited by a torque limiting clutch slipping or overrunning when the rotational resistance between the threaded parts rises due to the axial force, which is built up when the brake pad contacts the brake disc, thereby creating some kind of counter-torque.

In summary, the principle and functioning of such automatically acting adjusters, commonly referred to as "automatic brake adjusters" in the field of disc brakes, for the brake actuation mechanisms of the prior art as mentioned above is more or less the same. By means of at least one clutch, which comprises some degree of lost motion, in which the level of free motion is selected to be equivalent to the desired target clearance, i.e. the maximum allowable running clearance, the friction lining of the brake pad, e.g. the brake pad itself, will be progressively advanced towards the brake disc as the friction lining slowly decreases due to wear. Namely, if the friction linings do wear to such an extent that the running clearance is greater than the target clearance, the existing running clearance between the brake pad and the brake disc is taken up and the further additional movement of the brake pad towards the brake disc, which results from and thus corresponds to the actually existing excessive lining wear, causes the clutch to rotate, which rotation will advance the brake pad towards the brake disc. After contact of the brake pad with the brake disc, the increase load in the entire brake mechanism will cause the clutch to slip, thereby preventing further, now not required adjustment movements or any overloading of the adjustment mechanism.

In this respect it has been important that for all prior art brake actuation mechanisms the target clearance between the brake disc and the brake pad is set to be rather large in order to provide enough room for any thermal expansions of either the brake disc or the brake pad resulting e.g. from excessive braking. This should avoid the risk of force contact between these components in the release state of the disc brake, since such force contact would create an energy consuming dragging and may produce even more thermal expansion.

The available stroke of the actuator is generally selected to adapt to any elastic tensioning or widening of the brake caliper or other parts of the disc brake which will be loaded by the clamping force as these components are arranged within the closed flow of forces upon brake actuation. Furthermore, this stroke is also selected to adapt to the target clearance as chosen. In addition it is provided with some kind of safety margin which could take up some excessive slack without reaching its maximum limit, which in turn would result in failure to meet the expected clamping force.

One major drawback upon brake operation is that the brake pad and the brake disc will notably expand due to the excessive heat generation which could result in that the contact between these components, especially after an immediate consecutive braking, cannot be completely dissolved, leading to dragging and thereby further heat generation and extremely large wear.

For the purpose of reducing the risk of dragging, the adjustment mechanism of whatever design is normally configured to reduce only a certain fraction of the excessive clearance at each brake operation, i.e. the entire excessive clearance will consecutively be reduced by way of several brake operations. In case of some kind of disturbances during the braking process or imperfection in the components, such as tolerance deviations, such selected way of operation further reduces the risk of some kind of over-adjustment and dragging when compared to the compensation of the entire excessive clearance at one single brake operation only.

The torque limiting clutch as used in the adjustment mechanisms according to the prior art could include roller-ramp clutches as e.g. disclosed in WO 2011/113554 A2, or a common friction clutch as used in EP 0 730 107 A2. Further designs such as teethed clutches or torsional springs could be embodied as well.

The adjustment mechanisms as explained above actually act and perform the adjustment in the direction of the clearance reduction only. Such single action principle together with the fractional adjustment and with the selection of a rather large target clearance has proved to work well in the designs and embodiments of the prior art as known.

Nonetheless, such approach seems to be not an optimum solution for achieving the best possible utilization of the available actuator stroke. Namely, providing the desired safety margins to avoid the risk of dragging as described above in turn comes with a large actuator and/or stiff and by that heavy caliper, which generally is undesired both with respect to fuel savings, vehicle handling and manufacturing costs.

Therefore, in addition to the already given adjustment with respect to the reduction of wear-induced clearance there exists a need to provide an adjustment so as to increase the clearance, which proves to be too small with respect to dragging risks, independent from the clearance adjustment to compensate for wear.

From EP 1 524 449 A1 and DE 102 09 567 A1 it has been known to use electric motors as brake adjusters which drive the brake pads towards and away from the brake disc in order to always maintain a predetermined distance between these components, which driving is determined by electronic means. Such design, however, proves to be technically complicated, costly to produce and moreover sensitive to disturbances of all kinds.

From the prior art as mentioned there arises the need to eliminate the different problems and drawbacks associated therewith.

SUMMARY OF THE INVENTION

Thus, it is an object of the present invention to provide a disc brake and a brake actuation mechanism including an adjuster which enables both the adjustment of the clearance during brake actuation to compensate possible wear and, in addition, the adjustment with respect to an increase of the clearance to avoid the risk of dragging.

As a further object, the adjustment mechanism shall require less space and weight and shall furthermore be easy to assemble and the single components of which can be manufactured in an easy and cost-effective manner.

Moreover, it is an object of the present invention to provide for an adjustment method, which, independent from an adjustment of the wear-induced clearance, allows for the adjustment of the running clearance to also consider the risk of dragging.

These objects, respectively, are solved by a disc brake, a brake actuation mechanism with an adjustment mechanism, and a method for adjusting a clearance between a brake pad and a brake disc.

A disc brake is provided, which comprises a brake caliper, which straddles at least one brake disc, and a brake actuation mechanism. The brake actuation mechanism comprises an amplification mechanism for introducing a clamping force, a thrust element for transmitting the clamping force via a brake pad onto the brake disc, in which at the release state of the disc brake a clearance is set between said brake pad and the brake disc, and an adjustment mechanism for compensation of wear of said brake pad and/or said brake disc during brake actuation, the adjustment mechanism being configured to act on said thrust element and being configured to reduce said clearance between the brake disc and the brake pad during brake actuation motion.

According to a first embodiment of the invention the adjustment mechanism as such is configured to, during brake release motion, increase said clearance with a value, which may be smaller, equal or larger than the clearance reduction, in which the adjustment mechanism is purely mechanically activated. In other words, the adjustment mechanism, independent from its design, performs both the clearance reduction during brake actuation motion and the clearance increase during brake release motion only by means of interacting mechanical components of it, without the help of any external power source such as an electric motor.

According to a second embodiment of the invention, the adjustment mechanism comprises a first regulator unit which is configured to reduce said clearance between the brake disc and the brake pad during brake actuation motion. Furthermore, the adjustment mechanism comprises a second regulator unit which is then configured to, during brake release motion, increase said clearance with a value, which may be smaller, equal or larger than the clearance reduction.

Not necessarily, but preferably, the first regulator unit and the second regulator unit are mechanically activated.

The inventive concept as described above also applies to a brake actuation mechanism to be utilized in a disc brake and comprising an adjustment mechanism, and which therefore could comprise a corresponding configuration or corresponding first and second regulator units.

The second regulator unit could cooperate with components of the adjustment mechanism and/or components of the first regulator unit being part of said adjustment mechanism.

Furthermore, the second regulator unit could at least partly be incorporated in the adjustment mechanism and/or in the first regulator unit of it. Alternatively, the second regulator unit could be incorporated in a return mechanism for the brake actuation mechanism as well.

In other words, according to the invention, the second regulator unit, which shall provide the clearance increase during brake release motion, could thus be part of the disc brake separate from the actuation mechanism or at least part of said actuation mechanism. It could also be separate from the adjustment mechanism or at least part of said adjustment mechanism. Single components of both the actuation mechanism and the adjustment mechanism could therefore be configured and arranged to individually or commonly act within such second regulator unit in order to provide the clearance increase, which single components could, but not necessarily have to, be part of the first regulator unit as well.

According to a preferred embodiment, the first regulator unit and/or the second regulator unit are formed as a torque limiting clutch, respectively, the design and configuration of which could be selected depending on the respective kinematic requirements.

In a preferred embodiment of the invention, the actuation mechanism is made as a tappet design, such that all components of the first regulator unit and of the second regulator unit shall be mounted in the brake caliper in a functional interacting manner by means of central rod, which rod is supported in axial direction in the housing of the brake caliper and serves to also mount the single brake components in the housing of the brake caliper in such a way that these components do act in parallel to the rotational axis of the brake disc.

According to the invention the configuration and dimensioning of all components of the brake actuation mechanism and of the rod both in axial direction (i.e. parallel to the rotational axis of the brake disc) and in radial direction (i.e. around the central rod) are selected and tuned with respect to each other so that both the functioning and operation of the first regulator unit for the purpose of clearance reduction at brake application motion and that the functioning and operation of the second regulator unit for the purpose of clearance increase during brake release motion are enabled and coordinated. In particular, the configuration and dimensioning shall be in such way that, in case a torsional spring element, independent from its actual configuration and design, is used for the second regulator unit, a predetermined pretension is preferred for ensuring that the clearance increase motion to a value as defined will be realized.

In addition to such a pretensioning, a defined angular slack is provided between at least two components of the brake actuation mechanism and/or of the adjustment mechanism, preferably of the second regulator unit of it, which angular slack defines the value of clearance increase during brake release motion.

In a first principle for providing the desired clearance increase according to the invention, a torque shall be applied to some kind of torsional spring element during brake application. This torque, in the following, shall act on threaded parts of the adjustment mechanism over the defined angular slack at brake release. Thus, the angular slack is defined by that torque, which slack will be reversed at brake release.

According to one embodiment the torsional spring element could be configured and mounted in such a way so as to provide such angular slack without any torsional pretension imposed on it. The angular slack will be created by a torque that results from the tensioning of the spring element during application. It could thus be said that in this embodiment the angular slack is immanent to the torsional spring element.

Alternatively, according to another embodiment, the angular slack, which will be reversed at brake release, is defined by an angular offset between two components of the brake adjustment mechanism, which components are connected with the torsional spring element, which spring element preferably is installed with a torsional pretension resulting from its specific configuration on the one hand and from its positioning within the brake adjustment mechanism on the other.

Further alternatively, according to a second principle the invention provides a second regulator unit comprising a further one-way clutch in order to provide the clearance increase at brake release. Such additional one-way clutch cooperates with an one-way clutch, which already exists in the adjustment mechanism, namely in the first regulator unit, to provide the slipping motion for the clearance reduction during brake actuation. According to the invention, the additional one-way clutch has a built-in angular slack as needed for the purpose of clearance increase.

Preferably, such built-in angular slack is provided by the design and configuration of at least two components of the adjustment mechanism or the second regulator unit, which are thereby arranged relative to each other in such a way so as to comprise this angular slack between them, which angular slack is then taken up during brake release motion thereby providing the predetermined value for clearance increase.

According to the invention, such predetermined value is either provided as a limit, i.e. up to which the clearance shall be increased, or as the quantity itself to be increased. The adjustment mechanism or the second regulator unit thus could be configured to, during brake release motion, increase the clearance to a predetermined value, which value may be determined by the clearance reduction function, and/or to increase the clearance with a predetermined value.

Furthermore, the invention refers to a method for adjusting a clearance between a brake pad and a brake disc of a disc brake to a predefined value comprising the steps of compensating an excessive clearance between the brake pad and the brake disc, which excessive clearance results from the actual wear of the brake pad and/or the brake disc, during brake actuation motion before the brake pad comes into force contact with the brake disc thereby adjusting said clearance; and increasing the clearance during brake release motion after the brake pad has lost force contact with the brake disc.

Preferably, both steps are alternately and consecutively repeated over several brake actuation and brake return motions.

Most preferably, the step of increasing the clearance is performed with the same amount at every brake release motion.

The method according to the invention shall be further applied such that during brake actuation motion the clearance is adjusted to a first value and during brake release motion the clearance is increased to a second value, which second value is larger than the first value.

Preferably, the single steps of the method according to the invention are mechanically performed. The new method as defined by the invention, in principle is independent from the design, configuration and arrangement of the brake actuation mechanism, the adjustment mechanism and any regulator units associated and used therewith, as long as the design, configuration and arrangement of these components and modules is such so as to provide for an increase of the clearance between the brake pad and the brake disc during brake release motion.

The principles for clearance increase during brake release according to the invention could thus generally be applied to all kind of brake actuation and brake adjustment mechanisms, in which a mere mechanical activation shall be performed, however, these are preferably directed to designs of brake actuation mechanism as e.g. known from WO 2011/113554 of the applicant, to which disclosure it is herewith explicitly referred to and the content of which shall be incorporated herewith.

If according to the invention, an additional clearance increase function is provided and performed, which is preferably realized by components of the brake actuation and/or the adjustment mechanism and included within these mechanisms, it becomes apparent that several advantages could be realized.

First of all, the target clearance can be selected smaller without the risk of dragging at thermal expansion of disc and pads. Moreover, a reduced target clearance means a reduced stroke at the pads which can be utilized by allowing a larger elasticity in the caliper at the same actuator stroke or increasing the lever amplification at the same actuator stroke meaning that the actuator force and size can be reduced. Both alternatives mean reduction in weight and manufacturing costs as well as in energy consumption. The adjustment fraction can be selected larger without facing a risk of dragging due to some kind of over-adjustment caused by unexpected disturbances or imperfections in the mechanism and/or brake operation. This, in turn, means increased safety as the adjuster makes quicker compensations of large wear, e.g. occurring after driving downwards on long steep hills.

In addition, the adjusters according to the invention are less sensitive for improper manual setting after pad replacement and other servicing actions. If the pad clearance is set too small manually, it will be corrected automatically after a few applications. Furthermore, the adjustments in both directions at each brake application bring mechanism parts in repeating movements. By that the risk of sticking or jamming in adjuster screw threads or other parts is reduced.

As shown in the detailed embodiments below, the invention requires some extra elements for its sought function. These elements in addition provide an improved locking function against undesired clearance alterations caused by vibrations or similar.

In a preferred embodiment, the adjuster is of pure mechanical design meaning that it is simple and cost effective to produce, works without extra power sources, and is reliable with low sensitivity to various disturbances occurring in the harsh environment on a road vehicle.

BRIEF DESCRIPTION OF THE DRAWINGS

Further advantages and features of the present invention do become apparent with respect to the different embodiments as shown in the attached drawings.

FIG. 4a-c is a sequence of drawings showing schematically the movement of the brake pad upon adjustment of the clearance for a normal initial clearance according to the invention;

FIG. 5a-c is a sequence of drawings showing schematically the movement of the brake pad upon adjustment of the clearance for a too large initial clearance according to the invention;

FIG. 6a-c is a sequence of drawings showing schematically the movement of the brake pad upon adjustment of the clearance for a too small initial clearance according to the invention;

FIG. 7a is a lateral cross-section of a first embodiment of the actuation mechanism according to the invention;

FIG. 7b is a cross-section along K-K of FIG. 7a;

FIG. 8 is an explosive view of the first embodiment of the actuation mechanism;

FIG. 9 is a lateral cross-section of a second embodiment of the actuation mechanism according to the invention;

FIGS. 9a,9b,9c are cross-sections along S-S, L-L and P-P of FIG. 9, respectively;

FIG. 10 is an explosive view of the second embodiment of the actuation mechanism;

FIG. 11 is a lateral cross-section of a third embodiment of the actuation mechanism according to the invention;

FIGS. 11a,b are cross-sections along Y-Y and V-V of FIG. 11, respectively;

FIG. 12 is an explosive view of the third embodiment of the actuation mechanism;

FIG. 13 is a lateral cross-section of a fourth embodiment of the actuation mechanism according to the invention;

FIGS. 13a,b,c are cross-sections along I-I, Z-Z and X-X of FIG. 13, respectively;

FIG. 14 is an explosive view of the fourth embodiment of the actuation mechanism;

FIG. 15 is a lateral cross-section of a fifth embodiment of the actuation mechanism according to the invention;

FIGS. 15a,b are cross-sections along T-T and U-U of FIG. 15, respectively;

FIG. 16 is an explosive view of the fifth embodiment of the actuation mechanism; and FIG. 17 is a lateral cross-section of a sixth embodiment of the actuation mechanism according to the invention.

DETAILED DESCRIPTION OF THE INVENTION

In the following, for a better understanding of the invention, first the principle and functioning of an automatic brake adjuster related to the prior art shall be exemplarily explained.

Figure 1:
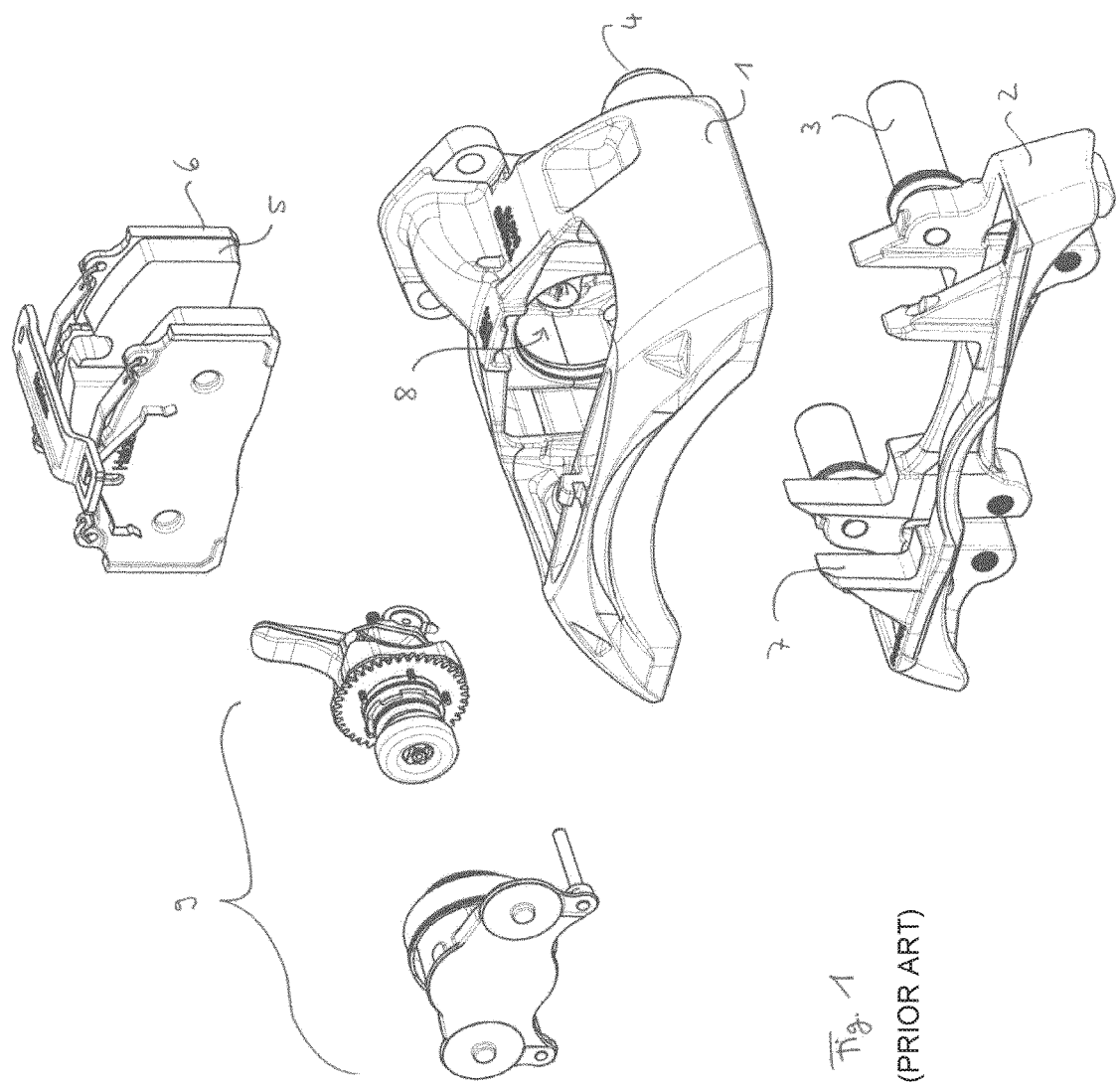
FIG. 1 is an explosive view of the substantial components of a disc brake according to the prior art.
Figure 2:
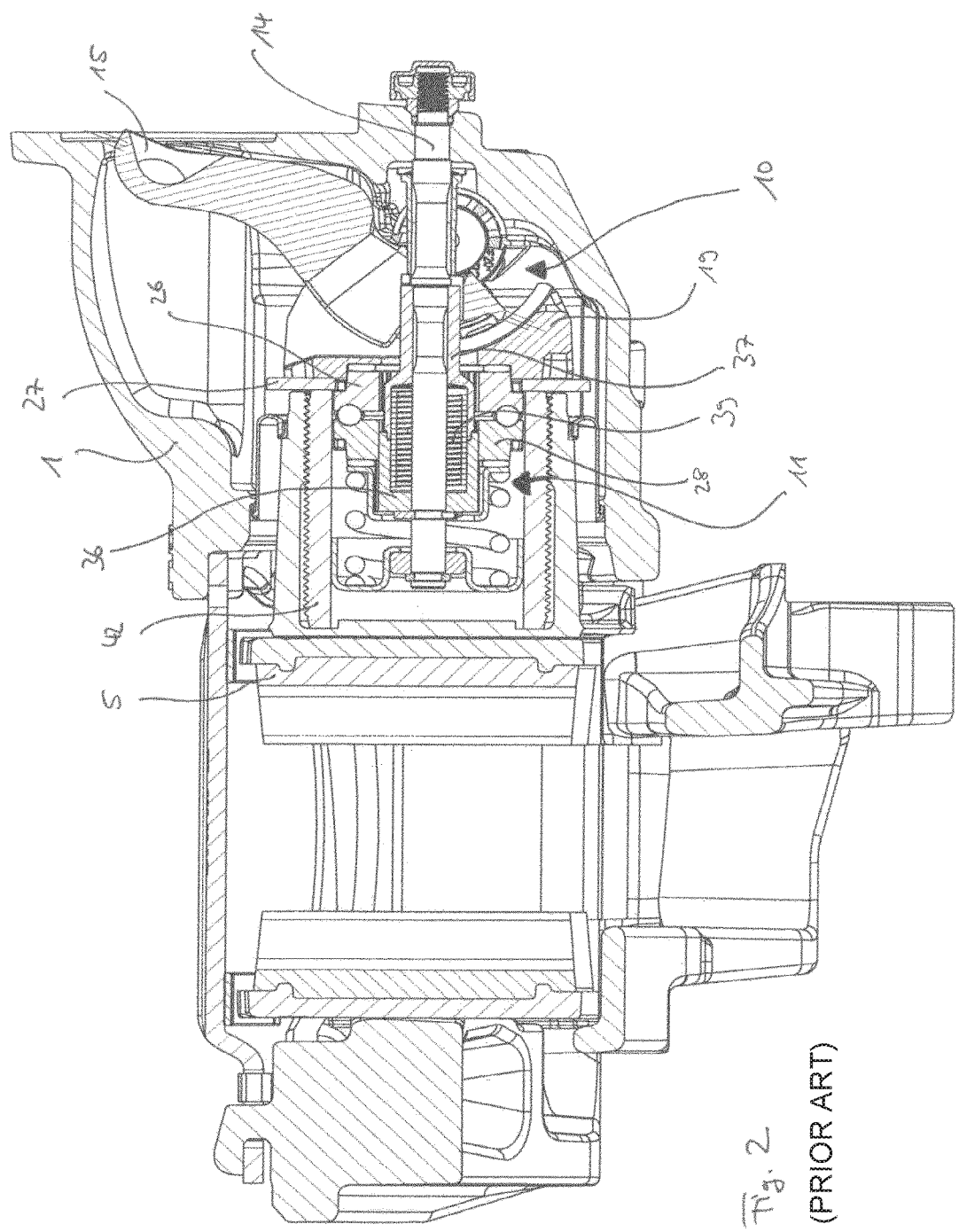
FIG. 2 is a lateral cross-sectional view of the disc brake in the assembled state according to the prior art.
Figure 3:
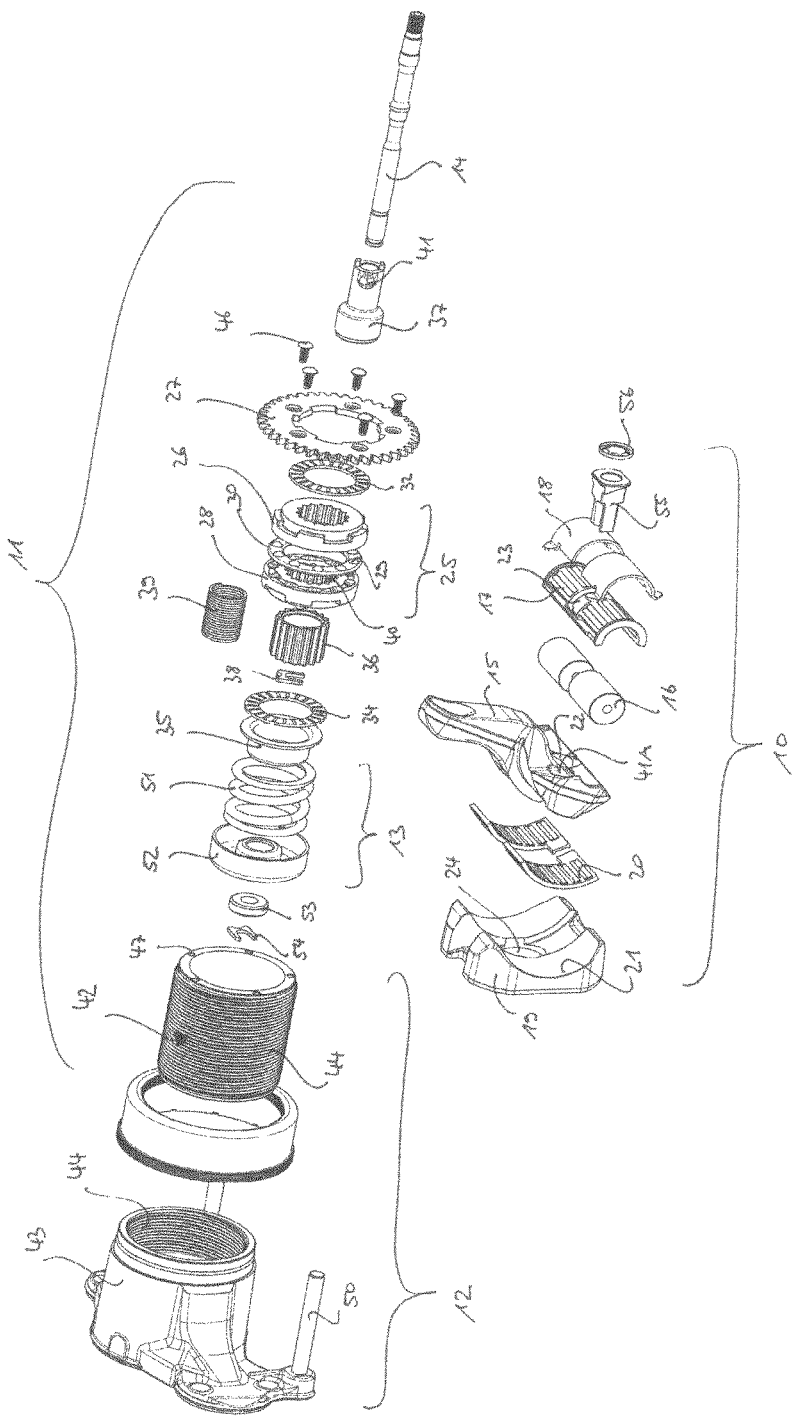
FIG. 3 is an explosive view of the single components of the actuation mechanism and the adjustment mechanism according to the prior art.

FIGS. 1-3 show a disc brake and a brake actuation mechanism embodied therein together with an automatic brake adjuster associated therewith, which for example is known from WO 2011/113554 A2 of the applicant, to which content herewith it is explicitly referred to. The brake actuation mechanism shown therein refers to a single tappet design. FIG. 1 shows the disc brake according to the prior art in explosive view with its substantial components, which are shown in their assembled state in FIG. 2 together with the brake actuation mechanism in its operating position. FIG. 3 shows an explosive view of the brake actuation mechanism 9 including the automatic brake adjuster with its single components.

Such a known disc brake comprises a brake caliper 1 which is slideably guided on a carrier 2 by means of slide bearings 3, which are fixed to the carrier 2 by means of bolts and received in openings 4 in the housing of the brake caliper 1, correspondingly. The brake caliper 1 overlaps and surrounds, respectively, brake pads 5 which are fixed on pad retainers 6 being axially guided in corresponding guidance surfaces 7 of the carrier 2. The brake pads 5 with their linings enclose a brake disc not shown herein.

As can be seen in FIG. 1 the brake caliper 1 comprises at the side facing the brake disc an opening 8, through which opening 8 a brake actuation mechanism 9 can act onto the brake disc, as this can be seen in FIG. 2, which further illustrates the mounting position of the brake actuation mechanism 9 in the brake caliper 1.

The brake actuation mechanism 9 substantially comprises an amplification mechanism 10, which introduces an actuating force originating from an hydraulic, pneumatic or electro-mechanical actuator (not shown herein) as a clamping force into the brake actuation mechanism 9 and thereby enforcing it in correspondence with a gear ratio being determined by its construction, an adjustment mechanism 11, which serves for compensation of brake lining wear, a thrust element 12, which transmits the enforced clamping force onto the brake disc, and a reset device 13 in order to return the brake actuation mechanism 9 in its starting position, in case no brake force is applied anymore by the actuator. These above-mentioned assembly groups are arranged on one central rod 14, which is aligned in parallel to the axis of the brake disc. The rod 14 serves as mounting means for the single assembly groups of the brake actuation mechanism on the one hand and as fixation means for the same in the housing of the brake caliper 1 on the other.

The amplification mechanism 10 comprises a lever 15, which is pivotably supported in the rear housing section of the brake caliper 1 in that it is rotatably supported against two rollers 16, which are placed eccentrically to the rotational axis of the lever 15. The cylindrical rollers 16 are rotatably received in a corresponding needle bearing cage 17, which is arranged in two support cups 18, in which the support cups 18 are supported in the rear housing section of the brake caliper 1. In doing so, the lever 15 is designed and configured in relation to the rollers 16 such that upon a pivoting movement around the rollers 16 an eccentric displacement of the lever 15 in relation to the rollers 16 takes place, which eccentric displacement or offset results in an enforcement of the force being introduced from the actuator into the lever 15.

Opposite to the rollers 16 the lever 15 is supported against a force-transmitting element 19 via further needle bearing cups 20, which force-transmitting element 19 comprises on the side of the lever 15 two substantially half cup-type recesses 21 which serve for receiving the needle bearing cups 20 and on the side of the brake disc planar surfaces in order, as will be described below, to interact with the adjustment mechanism 11 and thereby with the thrust element 12.

For the passage of the central rod 14 the lever 15 comprises an opening 22, the needle bearing cage 17 comprises an opening 23 and the force-transmitting element 19 comprises an opening 24, whereas the support cups 18, the rollers 16 and the needle bearing cups 20 are arranged to both sides of the rod 14 at corresponding positions, respectively.

The adjustment mechanism 11 is provided directly following the amplification mechanism 10 in direction towards the brake disc and includes a torque clutch, the mode of operation of which will be explained in the following.

The torque clutch is formed as a roller-ramp-mechanism 25, the single components of which can be at best seen in FIG. 2. The roller-ramp-mechanism 25 comprises a ramp body 26 which is non-rotatably fixed with a gear wheel 27 at its side facing away from the brake disc. The gear wheel 27 is configured to cooperate with a manual reset mechanism not shown herein.

Opposite to the ramp body 26 a support clutch ring 28 is provided. The support clutch ring 28 and the ramp body 26 encase several rollers 29 which are guided in a roller cage 30 and which are arranged between the support clutch ring 28 and the ramp body 26 co-axially moveably around the rod 14. The rollers 29 are each received by ramp surfaces 31, which are formed in the support clutch ring 28 on the one side and in the ramp body 26 on the other side thereby facing each other. One ramp surface 31 is followed by a subsequent ramp surface 31, respectively, in which all ramp surfaces 31 are arranged on a closed circular path around the rod 14. In FIG. 3 these ramp surfaces 31 can be only seen for the support clutch ring 28.

The ramp body 26 is supported against the force-transmitting element 19 by at least one low friction-bearing element 32 which is provided in a cylindrical recess 33 at the side of the force-transmitting element 19 facing the brake disc. Correspondingly, the support clutch ring 28 is supported against an external holding sleeve 35 by means of a further low friction-bearing element 34.

The external holding sleeve 35 and partly the support clutch ring 28 do co-axially enclose an internal holding sleeve 36 and partly the support clutch ring 28 and the ramp body 26 with the rollers 29 there in between do co-axially enclose a hollow shaft 37. The inner holding sleeve 36 and the hollow shaft 37 do mate at their face surfaces and are rotatably supported on the central rod 14, in which the internal holding sleeve 36 is axially fixed on the rod 14 by means of a snap ring or circlip 38. The hollow shaft 37 and the internal holding sleeve 36 in turn do co-axially enclose an override or sprag spring 39, in which the radial external surface of the sprag spring 39 is connected both with the radial inner surfaces of the hollow shaft 37 and of the internal holding sleeve 36, so that these both elements can, if needed, be non-rotatably connected with each other. The internal holding sleeve 36 is non-rotatably connected with the support clutch ring 28 by means of a toothing or serration 40.

In turn, the hollow shaft 37 comprises a pin-like element 41 with which the lever 15 is connected, in which this connection is designed such that upon a pivoting movement of the lever 15 the hollow shaft 37 will be set into rotation by means of this pin-like element 41. The pin-like element 41 is received by a recess 41A being arranged in the lower part of the lever 15, which can exemplarily seen in FIG. 9c. In this connection, the hollow shaft 37 completely passes the force-transmitting element 19.

The thrust element 12 comprises a hollow adjustment spindle 42 which at the outside is in engagement with the thrust piece 43 by means of a corresponding thread 44. At its face surface facing away from the brake disc the hollow adjustment spindle 42 is non-rotatably connected with the gear wheel 27 of the adjustment mechanism 11 by means of corresponding connecting elements such as e.g. rivets 46, which form a press-fit with corresponding blind bores 47 in the face surface of the adjustment spindle 42.

The gear wheel 27, in turn, is in a non-rotatable connection with the ramp body 26 by means of a splined connection 48. Thereby a rotational movement of the ramp body 26 will be indirectly transmitted onto the adjustment spindle 42.

The thrust piece 43 furthermore comprises at least one guiding element, for example a guiding pin 50, which is received in a corresponding opening in the brake caliper 1. By that it is ensured that the thrust piece 43 is non-rotatably guided relative to the brake caliper 1 and that a rotational movement of the hollow adjustment spindle 42 will be transferred into an axial longitudinal movement of the thrust piece 43.

The adjustment spindle 42 does not only co-axially encase the adjustment mechanism 11, but also the reset device 13. The reset device 13 follows the adjustment mechanism 11 in axial direction towards the brake disc and is arranged co-axially with respect to the rod 14 as well. The reset device 13 is made of a coil spring 51 which abuts against an abutment cup 52 at the end towards the brake disc. The abutment cup 52 is axially positioned and fixed at the end of the rod 14 facing the brake disc by means of a distance ring 53 and a snap ring 54. At its opposite side the coil spring 51 abuts against the external holding sleeve 35 of the adjustment mechanism 11. In this way the reset device 13 can function at the same time as a mechanism for applying a torque limitation onto the adjustment mechanism 11, as this shall be explained in connection with the description of the functioning of the adjustment mechanism 11 and the brake actuation mechanism 9.

Transverse to the axial direction, i.e. lateral towards the outside, the rollers 16 are guided and positioned by edges (not shown) protruding from the lever 15. At the opposite sides the rollers 16 are separated from the rod 14 by means of a distance sleeve 55 which virtually provides the inner lateral bearing surfaces for both rollers 16.

The position of the distance sleeve 55 is determined in axial direction by means of a spring ring 56 on the one side and by way of attaching to the hollow shaft 37 on the opposite side.

As can be seen from the FIGS. 2 and 3 the rod 14 comprises a corresponding contour with different diameters and groove arrangements in order to provide the support and bearing surfaces and the assembly means for the axial positioning of the single components as mentioned above.

In this connection the rod 14 on the one hand and the single components of the amplification mechanism 10, of the adjustment mechanism 11 and of the reset device 13 supported on it on the other hand are dimensioned in axial direction and configured such that in the mounted, biased condition of the rod 14 in the rear portion of the brake caliper, the coil spring 51 exerts a defined torque limitation by means of a then created permanent pretension onto the torque clutch, which exists in the adjustment mechanism device 11 in the form of a roller-ramp-mechanism 25.

The functioning of the brake actuation mechanism 9 with the adjustment mechanism 11 is as follows.

If a force is introduced from the actuator the lever 15 pivots around the rollers 16 and sets the hollow shaft 37 by means of the pin-like element 41 into rotation. For receiving the pin-like element 41 the lever 15 comprises the recess 41A, as exemplarily shown in FIG. 9c.

During actuation the sprag spring 39 locks the hollow shaft 37 with the internal holding sleeve 36 so that both do rotate together. Since the internal holding sleeve 36 is non-rotatably connected with the support clutch ring 28 by means of the toothing 40, the support clutch ring 28 co-rotates, accordingly.

If there is no contact between the brake lining 5 and the brake disc yet and thus no brake force will be transmitted, the support clutch ring 28 also rotates the ramp body 26 and therewith the gear wheel 27 which is non-rotatably connected therewith by means of a splined connection 48, and finally therewith the adjustment spindle 42, in which the rotation of the ramp body 26 is depending from the spring force exerted by the coil spring 51, which thereby provides the defined torque limit. The rollers 29 remain stationary in the ramp surfaces 31 being formed in the ramp body 26 at one side and in the support clutch ring 28 at the other side. The ramp surfaces 31 are continuously shaped in a circular way as ramps merging into each other so that the rollers 29 can override into the next ramp surface 31 as needed, respectively.

Since the thrust piece 43 is axially guided in the housing of the brake caliper 1 by means of the guidance pin 50 and thus cannot be rotated, a rotation of the adjustment spindle 42 results in an axial displacement of the thrust piece 43. Thereby the clearance will be compensated.

If during brake actuation the brake lining 5 comes into contact with the brake disc, a closed distribution/flow of forces with a corresponding counter force in relation to the introduced force is created. With increasing force in axial direction there exists a point at which the torque between the thrust piece 43 and the adjustment spindle 42 due to the friction in the thread 44 will be larger than the torque introduced from the torque clutch for the purpose of torque limitation by means of the coil spring 51. Accordingly, the adjustment spindle 42 and the gear wheel 27 and thus the ramp body 26 do rest.

However, at this moment the hollow shaft 37, the internal holding sleeve 36 and the support clutch ring 28 continue to rotate which results in that the rollers 29 cannot remain stationary anymore but do move further in the ramp surfaces 31 of the ramp body 26 and do pile against the ramp surfaces 31.

Since the ramp body 26 is supported against the force-transmitting element 19 by means of a low friction-bearing element 32 the piling of the rollers 29 causes that the support clutch ring 28 moves away from the ramp body 26 in direction towards the brake disc and thereby compresses the coil spring 51. The compression of spring 51 takes place during the entire brake actuation stroke and virtually forms the resilient part of the later reset movement.

In case the actuator does not further maintain a force on the brake actuation mechanism 9, the return movement supported by the reset device 13 will be initiated.

At the beginning there still exists a contact between the brake lining 5 and the brake disc at which still substantial forces do act. Then the single components support clutch ring 28 with the rollers 29 there in between and the hollow shaft 37 do rotate in the opposite rotational direction till they return to their original angular position at the beginning of the braking process. Thus, these components reverse their movements during the braking stroke in correspondence with the resilient part as previously mentioned.

If during the performed braking stroke no abrasion occurs at the brake lining 5 and thus no wear exists at the brake lining 5, a force transmitting contact between the brake linings 5 and the brake disc terminates exactly at that time at which the components support clutch ring 28 and hollow shaft 37 do return again to their angular starting position. These components then do rest in their position till the pin-like element 41 does abut against the opposite abutment surface of the connecting recess 41A of the lever 15, in which the pin-like element is guided, during the pivoting movement of the lever 15 in the opposite pivoting direction. If instead an adjustment for wear has taken place during the actuation, the hollow shaft 37 actively will be further rotated in the opposite rotational direction by means of the rearwardly directed pivoting movement of the lever 15, whereas the internal holding sleeve 36 and the support clutch ring 28 remain stationary due to the sprag spring 39. In this phase the sprag spring 39 then overrides by such an angle which corresponds to the adjustment of the clearance during the braking stroke.

The recess 41A of the lever 15 is a bit larger than the thickness of the pin-like element 41 thereby forming a tolerance. This tolerance corresponds to the clearance between the brake lining 5 and the brake disc which will be never adjusted for the purpose of functional safety.

It comes apparent that the adjustment mechanism 11 as described above is single-acting, meaning that it does only provide for clearance reductions in one direction, namely towards the brake disc.

According to the invention the brake actuation mechanisms containing a brake adjustment mechanism in the different embodiments, respectively, can be inserted in the housing of the brake caliper 1 in a similar way as described above and do use some of the above-described components in a similar way, such as e.g. the entire amplification mechanism 10 with the arrangement of the lever 15, the rollers 16 and the force transmitting element 19 as an unit, furthermore the central rod 14, the hollow shaft 37, the internal holding sleeve 36 and the sprag spring 39 on the one hand and the gear wheel 27, the hollow adjustment spindle 42 and the thrust piece 43 on the other hand. For brake application and adjustment, these components do operate and cooperate with each other in a similar way as explained above in connection with the tappet design of the prior art.

It is commonly known and accepted by those skilled in the art that the process of brake operation consists of a brake actuation motion and a brake release motion with a clamping force holding period between these two steps.

The brake actuation motion starts at the home or starting position (in which all components are in their resting position and in which no force transmission or introduction is performed), then the brake lever moves in the application direction until the brake lever stops moving at a position which corresponds to the desired clamping force for this particular brake operation when the brake pad is in contact with the brake disc. I.e. this motion consists of a first part without any force contact between the brake pad and the brake disc and a second part when the clamping force builds up.

Contrary thereto, the brake release motion spans from the start of brake lever movement at a position corresponding to the desired clamping force for this particular brake operation until the brake is fully released with the lever back in its home position. This motion consists of a first part when the clamping force decreases and a second part without any force contact between the brake pad and the brake disc.

The adjustment of the clearance, i.e. its reduction, in the prior art embodiment as described above, and in most other disc brakes of the prior art as listed in the introductory portion in the description here, thus takes place at the end of the first part of the application motion.

In the FIGS. 4a-c, 5a-c and 6a-c the different principles of adjustment motion according to the invention are schematically shown with the elements brake disc 57, brake pad 58, outer sleeve 59 of thrust piece being attached to brake pad, adjustment mechanism 60 being in threaded engagement with the outer sleeve 59 and lever 61.

The length of the adjustment mechanism 60 will change its axial length, i.e. in itself, depending on the performed adjustment movement, as exemplarily described above in relation to FIGS. 1-3 with respect to the prior art embodiment. The mechanical adjustment mechanism is based on the principle of a self-locking thread on an adjuster screw (e.g. corresponding to the inner adjustment spindle 42 in the prior art embodiment as explained above) interacting with the outer sleeve 59 (e.g. corresponding to the thrust piece 43 in the prior art embodiment as explained above) as mating part. These components are actively turned in relation to each other for clearance adjustment so as to provide, within the caliper housing, a variable axial distance between the amplification lever 61 and a brake pad 58 according to the wear on these pads and on one or several brake discs 57.

According to the invention, the double-acting adjustment function is divided into a clearance reduction function and a clearance increase function performed at different stages in the brake operation sequence.

The clearance reduction function is performed at brake application as known in prior art. I.e. after passing a predetermined distance Cr, a torque is applied to the threaded parts, namely the outer sleeve 59 and the component of the adjustment mechanism 60 being in threaded engagement therewith. This torque is transmitted from the rotatable lever 61 over an one-way clutch located within the adjustment mechanism 60 in its driving direction and limited by a torque limiting clutch located within the adjustment mechanism 60 and overrunning when the rotational resistance between the threaded parts rises due to axial force built-up at disc-to-pad contact.

In case of excessive clearance, the threaded parts will be rotated a certain angle before pad-to-disc contact, in case of correct clearance they will not. At brake release, reverse rotation of some of the adjustment mechanism parts are allowed by slipping in the one-way clutch without the same reverse rotation of the threaded parts, which gives a remaining adjustment if an excessive clearance was present. The overrunning angle may be reversed in the one-way clutch or in the overrunning clutch depending on selected designs.

The adjustment at each brake application is only a fraction f of the excessive clearance, depending on the pitch of the threaded parts and other design parameters and is usually often in the range of f=5-50%, which provides a rapid enough adjustment. As a consequence, it will take a number of brake applications to compensate an excessive clearance.

According to the invention the clearance increase function is performed at brake release by applying a torque on the threaded parts causing them to rotate in a clearance increase direction as soon as the rotational resistance at the threaded parts decreases at the loss of disc-to-pad force contact. This torque is applied over a rotational angle, which is predetermined by a built-in slack or similar, corresponding to a certain clearance increase Ci. The clearance increase is performed with the same amount Ci at every brake release irrespective of the actual clearance prior to, or after, the actual brake operation.

FIGS. 4a-c show the adjustment process, in which a normal initial clearance between the brake disc 57 and the brake pad 58 is present, i.e. in which existing wear has been compensated. FIG. 4a shows the starting position, FIG. 4b the braking position and FIG. 4c the fully released position with a clearance increase Ci, which release position will be the starting position for the next braking operation.

When, according to the invention, the clearance reduction function and the clearance increase function are combined, the rotation corresponding to distance Ci will be reversed just after the beginning of a brake application, if the initial clearance was equal to or larger than normal. Afterwards, at brake release, the clearance is increased by a predetermined amount by the inventive clearance increase function, as will be described below in connection with the different embodiments.

The resulting clearance after completion of a number of brake operations with ignorable wear during each operation, referred to as target clearance Ct, will thus depend on selected values of both clearance reduction Cr and clearance increase Ci.

As mentioned above, the clearance reduction function is designed to adjust away clearance exceeding the amount Cr in fractions f at each brake application until all excessive clearance is eliminated. When combined with a clearance increase function according to any of the embodiment principles to be explained below in further detail, the clearance Ci will be seen as excessive clearance by the clearance reduction function if the initial clearance was equal to or larger than normal. It means that a travel of Ci/f is required for reversing the clearance amount Ci at each single brake application. Thus, the target clearance Ct, after a number of brake operations with ignorable wear during each operation and without any other clearance influencing effects will be Ct=Cr+Ci/f.

FIGS. 5a-c show the adjustment process, in which a too large initial clearance between the brake disc 57 and the brake pad 58 is present, i.e. due to excessive wear. FIG. 5a shows the starting position, FIG. 5b the braking position and FIG. 5c the fully released position with a clearance increase Ci, which release position will be the starting position for the next braking operation.

If excessive clearance between the brake disc 57 and the brake pad 58 is present, the process of adjustment is the same as with normal initial clearance as shown in FIGS. 4a-c, with the difference that the clearance reduction at brake application now is larger than Ci. At brake release the clearance is increased with the amount of Ci as earlier explained and a resulting clearance reduction will remain after this brake operation. However, since only a fraction of the excessive clearance can be adjusted at each brake application (the amount of Ci always remains constant), several brake operations may be required to achieve the desired target clearance Ct between the brake disc 57 and the brake pad 58.

FIGS. 6a-c show the adjustment process, in which a too small initial clearance between the brake disc 57 and the brake pad 58 is present. This e.g. happens when the disc brake is left in a condition after a pad replacement. FIG. 6a shows the starting position, FIG. 6b the braking position and FIG. 6c the fully released position with a clearance increase Ci, which release position will be the starting position for the next braking operation.

Thus, if the clearance has been smaller than desired, only a part of or nothing of the clearance increase Ci is considered as the excessive clearance. Accordingly, to end up with the target clearance Ct (corresponding to FIG. 4a), several brake operations may be required to achieve a large enough target clearance Ct in an accumulated manner.

In summary, for all three cases as explained above, the value of clearance increase Ci is constant, but only the way and thus the amount of the clearance reduction does differ.

As the invention resides in the fact to combine the clearance reduction functions, as known from the prior art, with clearance increase functions to be performed exclusively upon brake release in controlled adjustment steps, several advantages can be achieved.

First, the target clearance Ct may be selected to be smaller than applied in prior art disc brakes. This will reduce the required stroke in the actuator or allows for larger elasticity in components loaded by the clamping force. The actuator could therefore be made smaller or, if already known actuator designs will still be used, this would allow for a larger amplification of the input force. With respect to larger elasticity, other materials could be used which comprise other properties and therefore are cheaper, though still offering the same strength for the required load carrying capacity.

Furthermore, the effect of a smaller target clearance Ct could be enhanced by the reversing of the clearance increase Ci at the beginning of a brake application meaning that the clearance part of the required stroke will correspond to the clearance Ct−Ci and not to the total target clearance Ct. This could be seen as some kind of "added actuation feed" function.

Second, the adjustment fraction f of the clearance reduction function may be selected larger as compared in prior art designs, since the risk of harmful over-adjustment is almost eliminated by the new clearance increase function. The quicker wear compensation enabled thereby allows a smaller available actuator stroke as the need of a stroke reserve for situations with rapid wear, e.g. at an alpine downhill, becomes less than in prior art designs.

Thus, in summary the invention contributes to better utilization of the available stroke in a number of ways and allows an increase in lever amplification, reduction in actuator size and/or caliper elasticity to be adjusted in a positive way, thereby providing reduced weight and cost, from which the overall consumption characteristics of the vehicle will benefit, accordingly.

The combination of the clearance increase functions with clearance reduction functions according to the invention will be realized with different types of torque limiting clutches, as will be explained with respect to the different embodiments in the following. In principle, torque limiting clutches of a slipping type, i.e. where reversing of the overrunning angle at brake release doesn't take place between the same clutch parts, are preferred for combining with the clearance increase function. However, also other types of torque limiting clutches like torsional springs and some ball- or roller-ramp clutches could be used for that purpose.

In the following, identical components are designated with the same reference numerals.

FIGS. 7-14 all refer to the first principle of the invention, in which the torque is created by a torsional spring element which is tensioned at brake application and arranged to act on threaded parts of the adjustment mechanism at brake release. In the embodiments shown in these Figs. the spring element shall preferably be pretensioned when installed to ensure a large enough driving torque to overcome rotational resistances by any means.

FIG. 7a shows an actuation mechanism 62 including a mechanical adjustment mechanism according to a first embodiment of the invention. FIG. 7b is a cross-section along K-K of FIG. 7a. Furthermore, FIG. 8 shows an explosive view of this design.

The rod 14 comprises a thread 63 at its end facing the brake disc. Onto this thread 63 a nut 64 is screwed which thereby encloses a distance sleeve 65 between it and the internal holding sleeve 36. Surrounding the hollow shaft 37 and the internal holding sleeve 36 is a first clutch ring 66, which is rotationally connected to the gear wheel 27 by a splined connection and supported against the force transmitting element 19 by a bearing 67. The first clutch ring 66 attaches to a second clutch ring 68, which thereby forms a friction clutch between these rings 66 and 68.

Between the second clutch ring 68 and the internal holding sleeve 36 a rolling guidance 69 is arranged, which provides a radial rotational connection and at the same time a low friction sliding in axial direction between these elements, in that rollers are supported in a toothing or serration of both the second clutch ring 68 and the internal holding sleeve 36. Directly attaching to the side surface facing the brake disc of the second clutch ring 68 a holding support ring 70 is provided, which encases a helical spring 71 between it and the abutment cup 52, which helical spring 71 is not pretensioned in torsional direction.

It becomes apparent that in this design the helical spring 71 can be easily set under a predetermined axial pretension by rotating the nut 64 in the corresponding direction and thereby exerting a force via the abutment cup 52 and the helical spring 71 onto the holding ring 70, thus introducing a predetermined torque limitation onto the friction clutch existing of the first and the second clutch rings 68 and 66.

The functioning is as follows. The torque limiting clutch made of the first clutch ring 66 and the second clutch ring 68 is of the slipping type and provides an angular displacement between them during brake application when the friction in the thread 44 rises due to pad-to-disc contact. The two clutch rings 66 and 68 are axially forced against each other by the helical spring 71 and therefore transmit a frictional torque up to a certain limit. At brake release nothing of the angular displacement is reversed in the torque-limiting clutch itself. Instead most of it is reversed in the one-way clutch comprising the wrap or sprag spring 39, which has a slipping direction corresponding to the brake release direction.

As explained, the helical spring 71 acts on the torque limiting clutch over the holding ring 70. Since there is no low friction bearing in this force path as compared to the prior art of FIGS. 1-3, the helical spring 71 will get a small angular deflection (angle Ai) during brake application due to its torsional elasticity and the friction torque from the second clutch ring 68, which is driven indirectly by the amplification lever 15. This angular deflection of the spring 71 will be reversed during brake release as soon as the pad leaves force contact with the disc and the friction torque between the threaded parts of the thread 44 falls below the elastic torque of the spring 71. At this stage the helical spring 71 will relax and rotate the adjustment spindle 42 in clearance increase direction and produce the clearance increase Ci. In this embodiment, the angular slack Ai needed for the clearance increase Ci is not created by two components of the actuation mechanism or of its adjustment mechanism due to their relative arrangement towards each other, but it is simply introduced in the helical spring 71 by the angular deflection Ai.

This design provides double acting adjustment but the amount of the clearance increase Ci depends strongly on the friction torque between the threaded parts. If this friction is very low, e.g. due to vibrations, the spring 71 will relax fully and Ci will be large. However, if the friction is large, e.g. due to stiff lubricant at low temperatures, the amount of relaxation of the spring 71 and Ci will be very small. It may influence the total clearance Ct rather much according to the earlier described relationship Ct=Cr+Ci/f where f often is selected to be less than 0.5.

This embodiment in fact utilizes the already existing reset mechanism of the brake actuation mechanism for the adjustment motions. Accordingly, the second regulator unit here consists of the helical spring 71, whereas the first regulator unit consists of the torque limiting clutch 66,68 and the remaining components of the adjuster.

As in this embodiment the spring 71 will be tensioned by an angle Ai in correspondence with the torsional friction as defined between clutch rings 66 and 68, which angle Ai will be fully reversed (low friction in the threads) or only in part (high friction in the threads), and which angle Ai in fact depends on the torsional elasticity of the spring 71, it could be said that the spring 71 immanently comprises and provides the clearance increase function.

According to the invention, the rotation of the adjustment spindle 42 in clearance increase direction can be also produced by an additional spring element.

FIG. 9 illustrates a second embodiment which embodies the first principle of adjustment motions according to the invention; FIG. 9a is a cross-section along S-S, FIG. 9b is a cross-section along L-L and FIG. 9c is a cross-section along P-P of FIG. 9; FIG. 10 is an explosive view of such second embodiment.

The brake actuation mechanism 72 including an adjustment mechanism according to the invention shown therein is similar to the previous embodiment.

It comprises an adjustment mechanism which is made of a first clutch ring 73 which is supported by a bearing 32 against the force transmitting element 19. A second clutch ring 74 is provided, which axially encases an intermediate clutch ring 75 with slide distance rings 76. The intermediate clutch ring 75 is supported against the internal holding sleeve 36 by a rolling guidance 77 which provides a radial rotational connection and at the same time a low friction sliding in axial direction between these components.

The second clutch ring 74 is supported via a bearing ring 78 against a holding ring 79 of the return coil spring 51, which itself is supported at the end of the actuation mechanism facing the brake disc against an abutment cup 52 in the known manner, which is fixed to the central rod 14 by fixation nut 80.

By means of the fixation nut 80 and the abutment cup 52 a distance ring 81 is enclosed between the latter and the internal holding sleeve 36. The second clutch ring 74 is axially elongated and thereby supported via a rolling guidance 82 against the distance ring 81, where it comprises a greater diameter (see FIG. 9b).

Facing the brake disc, the distance ring 81 comprises a smaller diameter and is surrounded by a torsional spring element in the form of a clock spring 83, as this can best be seen in FIG. 9a. The inner free end of the clock spring 83 is attached to the distance ring 81, whereas the outer free end of the clock spring 83 is attached to the inner surface of the second clutch ring 74.

The actuation mechanism 72 with the adjustment mechanism shown in FIGS. 9-10 works in a similar way as the previous embodiment, with the difference that here the rotation of the adjustment spindle 42 in clearance increase direction is produced by the separate clock spring 83, as this can be seen in FIG. 9a. This torsional spring 83 is configured to be able to deflect elastically in axial direction at brake application. It is angularly pretensioned and works together with an angular slack Ai arranged between the distance ring 81 and the second clutch ring 74 thereby limiting its angular deflection, as this can be seen in FIG. 9b.

The clock spring 83 deflects a predetermined angle at brake application according to the angular slack Ai. At brake release, however, after the pad has left force contact with the disc, it relaxes the same amount irrespective of the friction torque between the threaded parts of the adjustment spindle 42 and the thrust piece 43 due to the angular pretension with assures a relaxation torque which is always larger than the friction torque between the threaded parts at this stage. In this way the pad to disc clearance is increased at every brake release with the same amount Ci due to the relaxation of the clock spring 83, which will be then transmitted via the second clutch ring 74 of the friction clutch 73, 74, 75, 76 and the gear wheel 27 to the adjustment spindle 42 thereby leading to a retraction of the thrust piece 43.

Accordingly, in this embodiment the second regulator unit is formed by the clock spring 83 and to some extent by the friction clutch 73,74,75,76 and gear wheel 27, which modules do also form part of the first regulator unit.

The brake actuation mechanism of FIGS. 9 to 10 could be further modified and combined with other types of torque limiting clutches, e.g. ball-ramp clutches as known from the prior art. FIGS. 11 to 12 illustrate such a modified brake actuation mechanism 84 including a modified brake adjustment mechanism.

A first clutch ring 85 is again supported against the force transmitting element 19 by a bearing 32. Similar to the previously described embodiment, a second clutch ring 86 is provided, which is supported against a distance ring 81 by a rolling guidance 82 and cooperating with a torsional spring 83 as described above.

The first clutch ring 85 and the second clutch ring 86 enclose an intermediate roller-ramp clutch consisting of a ramp body ring 87 comprising ramp surfaces 88, in which rollers 89 of a roller cage 90 are rotatably supported, respectively. The functioning of the roller-ramp clutch is similar as it has been described with respect to the prior art in connection with FIGS. 1-3 above.

The ramp body ring 87 is supported against the internal holding sleeve 36 by means of a rolling guidance 91 providing radial rotational connection and low friction sliding between these components. Between the ramp body ring 87 and the second clutch ring 86 further slide distance rings 92 are provided.

In this embodiment, an extra one-way clutch is provided being configured as a wrap spring 93 with separated turns. The wrap spring 93 is arranged between the second clutch ring 86 and the adjustment spindle 42.

According to the invention, the wrap spring 93 with separated turns is configured and arranged so as to absorb any axial displacement resulting from the ramp climbing process. In order to achieve a desired clearance, the ramp surfaces 88 may preferably be made rather short to let the rollers 89 move over to the adjacent ramp during the force transmitting part of the brake application.

In this embodiment, the second regulator unit is formed by the torsional spring 83 and the wrap spring 93. The angular slack Ai is provided between the elements distance ring 81 and second clutch ring 86 in a similar way as described with respect to the previous embodiment.

A further embodiment of a brake actuation mechanism according to the invention is shown in FIGS. 13-14; FIG. 13a is a cross-section along I-I, FIG. 13b is a cross-section along Z-Z and FIG. 13c is a cross-section along X-X of FIG. 13; FIG. 14 is an explosive view of such fourth embodiment.

The brake actuation mechanism 94 including an adjustment mechanism shown therein comprises a roller-ramp clutch with a first clutch ring 95, being supported against the force transmitting element 19 via bearing 32, and a second clutch ring 96 enclosing a roller cage 97 with rollers 98 being received in ramp surfaces 99 of both clutch rings 95, 96.

Similar as in the previous embodiment, the second clutch ring 96 is radially supported against the internal holding sleeve 36 by a rolling guidance 100 providing radial rotational connection and low friction axial sliding between these components. Axially, the second clutch ring 96 is supported against a radial flange of a sleeve 101 via a bearing ring 102. Opposite thereto a further bearing ring 103 is provided with which the sleeve 101 is supported against a holding ring 79 for the return coil spring 51. Also here, the sleeve 101 is radially supported via a radial bearing ring 82 against a distance ring 104 and cooperates with a clock spring 83 in a manner as described above.

In this embodiment, however, the distance ring 104 is radially to the inside encasing a friction clutch in the form of package of axially pretensioned spring washers 105 (e.g. Belleville washers), which attaches to an inner sleeve 106 surrounding the central rod 14.

The sleeve 101 comprises at its flange at the side facing away from the brake disc a pin 107 which is slideably received in a longitudinal recess 108 of the adjustment spindle 42, as can best be seen in FIG. 13c. Thus, the sleeve 101 and the adjustment spindle 42 are fixedly rotationally connected, instead by an extra one-way clutch as described in the previous embodiment.

By that and due to the frictional connection of the inner sleeve 106 with the distance ring 104 due to the package of spring washers 105 it is enabled that the clearance reduction upon brake actuation will be at least partly reversed upon brake release, but still to the extent which ensures a safety margin against dragging. This safety margin is again defined by the angular slack Ai provided between the distance ring 104 and the sleeve 101, immanently designed by their radial arrangement. In other words, according to this embodiment, the clearance increase is realized with a value which is smaller than or equal to the previous clearance reduction.

The second regulator unit according to this embodiment is formed by clock spring 83, the additional package of axially pretensioned spring washers 105 and the pin-recess connection 107/108 between the adjustment spindle 42 and the sleeve 101.

In summary, in the different embodiments according to the invention as described above the required torque will be produced by a torsional spring element which will be tensioned at brake application, in which the torsional spring element shall be arranged and configured to act on the threaded parts of the adjustment mechanism over an angle Ai at brake release. Preferably, the torsional spring element shall be pretensioned when installed. The pretension shall be selected to ensure a large enough driving torque so as to overcome rotational resistances over the entire angle Ai. The angular slack Ai is either immanent with the torsional spring element used or provided by an angular offset between two components of the adjustment mechanism, which components are connected with and cooperating with the torsional spring element, accordingly. In the latter case the torsional spring element experiences an extra tension on top of the pretension in correspondence with the angle Ai during brake application, which is defined by the angular slack of the two components. At brake release this angle Ai is reversed irrespective of the friction in the threads since the torque resulting from the pretensioning of the spring is selected to be always larger than said friction.

Contrary thereto, according to the second principle of the invention, the required torque is transmitted from the rotatable lever over a first one-way clutch, basically intended for the clearance reduction function as known in the prior art, in its slipping direction. The torque is limited to the slipping torque of the first one-way clutch which here is selected large enough to overcome rotational resistances. In this embodiment principle according to the invention, the first one-way clutch cooperates with a second one-way clutch with a built-in slack Ai, which forces the first one-way clutch to slip after a rotation of this angle Ai.

Such an embodiment is exemplarily shown in FIGS. 15-16. FIG. 15 shows a brake actuation mechanism 109; FIGS. 15a and b cross-sections along T-T and U-U of FIG. 15; and FIG. 16 is an explosive view of the mechanism.

The brake actuation mechanism 109 further comprises an intermediate sleeve 110 which radially inside is supported via a rolling guidance 111 against the internal holding sleeve 36 for providing radial rotational connection and low friction axial sliding between these components, whereas radially outside said intermediate sleeve 110 is connected to the adjustment spindle 42 by means of large wrap spring 112. In axial direction, the intermediate sleeve 110 is supported on one side via a bearing 32 with the force transmitting element 19 and opposite thereto via another bearing ring 113 to a holding ring 114 for the return coil spring 51.

Between the internal holding ring 36 and the abutment cup 52 for the coil spring, a distance sleeve 115 is provided, which is connected by a splined connection with an outer ring 116, which splined connection comprises such a play that an angular slack Ai is provided between these components as can be seen from FIG. 15a. The outer ring 116 is connected with the internal holding sleeve 36 by means of a further inner wrap spring 117, which thereby surrounds both components.

The large wrap spring 112 constitutes a torque limiting clutch of a slipping type allowing angular displacement during brake application when the friction in the threaded parts between the adjustment spindle 42 and the thrust piece 43 rises due to pad-to-disc contact.

The wrap spring 112 comprises different diameters on two axially separated sections 112A and 112B transmitting a frictional torque up to a certain limit at brake application by slipping at one end and gripping at the other. At brake release it is able to transmit at least about the same torque by slipping and gripping in the ends opposite to those at brake application.

The second wrap spring 117 at the end of the adjustment mechanism close to the brake disc acts as an one-way clutch. Together with the distance sleeve 115 and the outer ring 116 providing the angular slack Ai, the clearance increase function is enabled. At one end the second wrap spring 117 acts on the internal holding sleeve 36 and thereby on the adjustment spindle 42 via the large wrap spring 112 and at the other end on the outer ring 116. The outer ring 116 is connected to the distance ring 115 with a determined angular slack Ai between these two parts. The distance ring 115 is clamped and by that rotationally locked to the central rod 14.

The second wrap spring 117 is driven in its slipping direction at brake application and brings with it the outer ring 116 until the angular slack Ai is passed. When it is passed, the outer ring 116 stops and the second wrap spring 117 will slip. At brake release a torque is transmitted to the adjustment spindle 42 via the ordinary one-way clutch, comprising the inner first wrap spring 39 like in the earlier examples, and the large wrap spring 112.

The first wrap spring 39 in this embodiment according to the invention is designed to transmit a large enough torque in its slipping direction for driving the adjustment spindle 42 in clearance increase direction. At beginning of the brake release, when the friction torque in the threads 44 is large, the first wrap spring 39 slips. But when the brake pad loses force contact with the brake disc, the first wrap spring 39 will drive the adjustment spindle 42 in clearance increase direction until the angular slack Ai between outer ring 116 and the fixed distance sleeve 115 is passed. This rotation is stopped after this angle Ai, because the torque from the first wrap spring 39 in its slipping direction is less than the gripping torque of the second wrap spring 117.

In this way the pad to disc clearance is increased at every brake release with a defined angular amount Ci corresponding to the angular slack Ai between the outer ring 116 and the fixed distance sleeve 115. Like in the earlier design examples, this amount is reversed at the next brake application by the clearance reduction function if the initial clearance was equal to, or larger, than the desired clearance. If it was smaller, the result will be a remaining clearance increase.

According to this embodiment, the second regulator unit thus is formed by the inner distance sleeve 115, the outer ring 116, the second wrap spring 117, the first wrap spring 39 and the outer wrap spring 112, whereas the first regulator unit includes the first wrap spring 39 and the outer wrap spring 112 as well.

FIG. 17 illustrates a sixth embodiment of a brake actuation mechanism according to the invention, which is an alternative to the previous embodiment.

The brake actuation mechanism 118 including the adjustment mechanism comprises at the end facing the brake disc a distance ring 119, basically made as an one piece of the outer ring 116 and the distance sleeve 115 of the previous embodiment. The distance ring 119 comprises a conically shaped outer recess 120 at the side of the external holding sleeve 35. The shaped outer recess 120 of the distance ring 119 is encased by the second wrap spring 117.

The angular slack Ai in this design in fact is achieved and arranged as the reduction of the outer diameter of the distance ring 119 axially most close to the internal holding sleeve 36. A change in torque direction from slipping to gripping direction at brake release will force the second wrap spring 117 to contract the turns of its wires into a smaller diameter before they make a firm grip and stop the rotation of the adjustment spindle 42 in clearance increase direction. Thus, the behavior of this brake actuation mechanism 118 will be similar as with the one described earlier, however the angular slack here will be less plain.

Nonetheless, this embodiment can be realized by less components and due to the fact, that all components utilized by the adjustment mechanism for both clearance reduction and clearance increase are simply made rotationally shaped and thereby cheap components, such brake actuation mechanism is easy to assemble and furthermore provides a safe and reliable functionality.

Accordingly, in this embodiment the second regulator unit is provided by the distance sleeve 119 with the defined conically shaped outer recess 120, the second wrap spring 117, the first wrap spring 39 and the outer wrap spring 112, whereas the first regulator unit includes the first wrap spring 39 and the outer wrap spring 112 as well.

Alternatively, the recess 120 on distance ring 119 may be further combined with, or replaced with, a similar recess on the internal holding sleeve 36 further enhancing the effect of providing an angular slack Ai thereby.

The invention claimed is:

1. A disc brake comprising a brake caliper, which straddles at least one brake disc, and a brake actuation mechanism comprising:
   an amplification mechanism for introducing a clamping force,
   a thrust element for transmitting the clamping force via a brake pad onto the brake disc, in which, at the release state of the disc brake, a clearance is set between said brake pad and the brake disc,
   an adjustment mechanism for compensation of wear of said brake pad and/or said brake disc during brake actuation, the adjustment mechanism being configured to act on said thrust element and comprising a first automatic brake adjuster being configured to reduce said clearance between the brake disc and the brake pad during brake actuation motion,
   characterized by
   a second automatic brake adjuster being configured to, during brake release motion, increase said clearance with a value, which may be smaller, equal or larger than the clearance reduction,
   in which the first automatic brake adjuster and/or the second automatic brake adjuster are formed as a torque limiting clutch, respectively.

2. The disc brake according to claim 1, in which the first automatic brake adjuster and the second automatic brake adjuster are mechanically activated.

3. The disc brake according to claim 1, in which the second automatic brake adjuster is cooperating with components of the adjustment mechanism and/or components of the first automatic brake adjuster.

4. The disc brake according to claim 3, in which the second automatic brake adjuster is at least partly incorporated in the adjustment mechanism and/or in the first automatic brake adjuster.

5. The disc brake according to claim 1, in which the second automatic brake adjuster is incorporated in a return mechanism for the brake actuation mechanism.

6. The disc brake according to claim 1, in which the second automatic brake adjuster is configured to increase said clearance to a predetermined value during brake release motion.

7. The disc brake according to claim 1, in which the second automatic brake adjuster is configured to increase said clearance with a predetermined value during brake release motion.

8. The disc brake according to claim 6, in which the second automatic brake adjuster comprises at least two components which are arranged relative to each other so as to comprise an angular slack between them, which angular slack is taken up during brake release motion thereby providing the predetermined value for clearance increase.

9. A brake actuation mechanism for a disc brake comprising:
   an amplification mechanism for introducing a clamping force onto a thrust element, which transmits the clamping force via a brake pad onto a brake disc of the disc brake,
   an adjustment mechanism for compensation of wear of said brake pad and/or said brake disc during brake actuation, the adjustment mechanism being configured to act on said thrust element and comprising a first automatic brake adjuster being configured to reduce said clearance between the brake disc and the brake pad during brake actuation motion,
   characterized by
   a second automatic brake adjuster being configured to, during brake release motion, increase said clearance with a value, which may be smaller, equal or larger than the clearance reduction,
   wherein said first automatic brake adjuster includes a torque limiting clutch and a first one-way clutch and said second automatic brake adjuster includes a second one-way clutch.

10. The brake actuation mechanism according to claim 9, in which the first automatic brake adjuster and the second automatic brake adjuster are mechanically activated.

11. The brake actuation mechanism according to claim 9, in which the second automatic brake adjuster is cooperating with components of the adjustment mechanism and/or components of the first automatic brake adjuster.

12. The brake actuation mechanism according to claim 11, in which the second automatic brake adjuster is at least partly incorporated in the adjustment mechanism and/or in the first automatic brake adjuster.

13. The brake actuation mechanism according to claim 9, in which the second automatic brake adjuster is incorporated in a return mechanism for the brake actuation mechanism.

14. The brake actuation mechanism according to claim 9, in which the first automatic brake adjuster and/or the second automatic brake adjuster are formed as a torque limiting clutch, respectively.

15. The brake actuation mechanism according to claim 9, in which the second automatic brake adjuster is configured to increase said clearance to a predetermined value during brake release motion.

16. The brake actuation mechanism according to claim 9, in which the second automatic brake adjuster is configured to increase said clearance with a predetermined value during brake release motion.

17. The brake actuation mechanism according to claim 15, in which the second automatic brake adjuster comprises at least two components which are arranged relative to each other so as to comprise an angular slack between them, which angular slack is taken up during brake release motion thereby providing the predetermined value for clearance increase.

18. A method of adjusting a clearance between a brake pad and a brake disc of a disc brake to a predefined value, the disc brake having an amplification mechanism for introducing a clamping force, a thrust element for transmitting the clamping force via a brake pad onto the brake disc, in which, at the release state of the disc brake, a clearance is set between said brake pad and the brake disc, a first automatic brake adjuster including a torque limiting clutch and a first one-way clutch and a second automatic brake adjuster including a second one-way clutch, performing the steps of:
  reducing excessive clearance between the brake pad and the brake disc with the first automatic brake adjuster during brake actuation motion, which excessive clearance results from the actual wear of the brake pad and/or of the brake disc, during brake actuation motion before the brake pad comes into force contact with the brake disc; and
  increasing the clearance between the brake pad and the brake disc with the second automatic brake adjuster through an angular slack of the second one-way clutch during brake release motion after the brake pad has lost force contact with the brake disc.

19. The method according to claim 18, in which both steps are alternately and consecutively repeated over several brake actuation and brake return motions.

20. The method according to claim 18, in which the step of increasing the clearance is performed with the same amount at every brake release motion.

21. The method according to claim 18, in which during brake actuation motion the clearance is adjusted to a first value and during brake release motion the clearance is increased to a second value, which second value is larger than the first value.

22. The method according to claim 18, in which both steps are mechanically performed.

23. The method according to claim 18, wherein the excessive clearance between the brake pad and the brake disc is compensated for by a first automatic brake adjuster of the adjustment mechanism.

24. The method according to claim 18, wherein the clearance during brake release motion after the brake pad has lost force contact with the brake disc is increased by a second automatic brake adjuster of the adjustment mechanism.

25. The disc brake according to claim 1, wherein said first automatic brake adjuster includes a first one-way clutch and said second automatic brake adjuster includes a second one-way clutch,
  wherein said increase of the clearance during brake release motion occurs through an angular slack of the second one-way clutch.

26. The disc brake according to claim 9, wherein said increase of the clearance during brake release motion occurs through an angular slack of the second one-way clutch.

* * * * *